United States Patent
Jung et al.

(10) Patent No.: US 10,990,208 B2
(45) Date of Patent: Apr. 27, 2021

(54) METHOD FOR DISPLAYING CONTENT IN EXPANDABLE SCREEN AREA AND ELECTRONIC DEVICE SUPPORTING THE SAME

(71) Applicant: Samsung Electronics Co., Ltd., Gyeonggi-do (KR)

(72) Inventors: Hanchul Jung, Gyeonggi-do (KR); Jungchul An, Gyeonggi-do (KR); Sungho Lee, Gyeonggi-do (KR); Youngin Choi, Gyeonggi-do (KR); Jungyeob Oh, Gyeonggi-do (KR); Bonghak Choi, Gyeonggi-do (KR); Donghyun Yeom, Gyeonggi-do (KR); Minwoo Yoo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/407,855

(22) Filed: May 9, 2019

(65) Prior Publication Data
US 2019/0346954 A1 Nov. 14, 2019

(30) Foreign Application Priority Data
May 9, 2018 (KR) .................. 10-2018-0053072

(51) Int. Cl.
*G06F 3/041* (2006.01)
*G09G 5/00* (2006.01)
(Continued)

(52) U.S. Cl.
CPC .......... *G06F 3/0412* (2013.01); *G06F 1/1624* (2013.01); *G06F 1/1652* (2013.01);
(Continued)

(58) Field of Classification Search
CPC .... G06F 3/0412; G06F 3/0416; G06F 3/0481; G06F 1/1624; G06F 1/1652;
(Continued)

(56) References Cited

U.S. PATENT DOCUMENTS 10,028,227 B2    7/2018   Kim et al.
10,061,358 B2 *  8/2018   Lee .................... H04M 1/0237
(Continued)

FOREIGN PATENT DOCUMENTS

KR     10-2004-0026325    3/2004
KR     1020100028343     3/2010
(Continued)

OTHER PUBLICATIONS

KR Notice of Preliminary Examination dated Feb. 5, 2021 issued in counterpart application No. 10-2018-0053072, 4 pages.
(Continued)

*Primary Examiner* — Chad M Dicke
(74) *Attorney, Agent, or Firm* — The Farrell Law Firm, P.C.

(57) ABSTRACT

An electronic device includes a first structure, a second structure, a flexible touch screen display layer including a plane part and a bendable portion, an application processor, at least one display driver integrated circuit, and a memory. The memory stores instructions that, when executed while the application processor is inactivated, cause the at least one display driver integrated circuit to display at least one first object in a first area of the plane part in a first state where the first structure is closed with respect to the second structure and to display at least one second object associated with the first object in a second area of the plane part or in a third area of the bendable portion in a second state where the first structure is opened with respect to the second structure.

14 Claims, 23 Drawing Sheets

(51) Int. Cl.
*G06F 3/0481* (2013.01)
*G06F 1/16* (2006.01)

(52) U.S. Cl.
CPC .......... *G06F 3/0416* (2013.01); *G06F 3/0481* (2013.01); *G09G 5/003* (2013.01); *G06F 2203/04102* (2013.01); *G09G 2354/00* (2013.01); *G09G 2380/02* (2013.01)

(58) Field of Classification Search
CPC ....... G06F 2203/04102; G06F 3/04886; G06F 1/3231; G06F 1/3287; G06F 1/3265; G09G 5/003; G09G 2380/02; G09G 2354/00; G09G 2330/021; G09G 2330/022; H04M 1/0235; H04M 1/0266; H04M 1/0268
See application file for complete search history.

(56) References Cited

U.S. PATENT DOCUMENTS

| | | | |
|---|---|---|---|
| 10,128,458 B2* | 11/2018 | Lee | G09G 3/001 |
| 10,178,208 B2* | 1/2019 | Kim | H04M 1/0268 |
| 10,241,542 B2* | 3/2019 | Kwak | G06F 1/1622 |
| 10,310,733 B2* | 6/2019 | Kim | G06F 3/044 |
| 10,317,944 B2* | 6/2019 | Kummer | H04M 1/0235 |
| 10,416,883 B2* | 9/2019 | Kim | G06F 3/03547 |
| 10,937,393 B2 | 3/2021 | Lee et al. | |
| 2012/0133484 A1* | 5/2012 | Griffin | G06F 21/51 |
| | | | 340/5.54 |
| 2012/0299825 A1* | 11/2012 | Takahashi | G06F 1/1624 |
| | | | 345/156 |
| 2013/0275910 A1* | 10/2013 | Kim | G06F 3/0484 |
| | | | 715/800 |
| 2014/0028596 A1* | 1/2014 | Seo | G06F 1/1652 |
| | | | 345/173 |
| 2014/0211399 A1* | 7/2014 | O'Brien | G06F 1/1624 |
| | | | 361/679.26 |
| 2015/0331593 A1* | 11/2015 | Lee | G06F 1/1677 |
| | | | 345/667 |
| 2015/0338888 A1* | 11/2015 | Kim | G06F 1/1677 |
| | | | 345/156 |
| 2016/0026219 A1* | 1/2016 | Kim | H04M 1/0245 |
| | | | 345/173 |
| 2016/0132074 A1* | 5/2016 | Kim | G06F 1/1652 |
| | | | 715/769 |
| 2016/0307545 A1 | 10/2016 | Lee et al. | |
| 2016/0378270 A1 | 12/2016 | Lee et al. | |
| 2017/0064847 A1* | 3/2017 | Lim | G09F 9/00 |
| 2017/0154609 A1* | 6/2017 | Yoon | G06F 3/0412 |
| 2017/0280394 A1 | 9/2017 | Kim et al. | |
| 2017/0286042 A1* | 10/2017 | Lee | G06F 3/14 |
| 2019/0146558 A1 | 5/2019 | Ohata et al. | |

FOREIGN PATENT DOCUMENTS

| | | |
|---|---|---|
| KR | 10-2016-0034075 | 3/2016 |
| KR | 10-2016-0123201 | 10/2016 |
| KR | 1020170000553 | 1/2017 |
| WO | WO 2017/208552 | 12/2017 |

OTHER PUBLICATIONS

Korean Notice of Allowance dated Mar. 17, 2021 issued in counterpart application No. 10-2018-0053072, 8 pages.

* cited by examiner

METHOD FOR DISPLAYING CONTENT IN EXPANDABLE SCREEN AREA AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2018-0053072, filed on May 9, 2018, in the Korean Intellectual Property Office, the disclosure of which is incorporated by reference herein in its entirety.

BACKGROUND

1. Field

The present disclosure generally relates to a method for displaying content of an expandable screen area and an electronic device supporting the same.

2. Description of Related Art

As electronic devices with independent operating systems rapidly spread, such electronic devices provide various functions or services. As such, a display that provides a recognition (e.g., input) or representation (e.g., output) of information resources that accompany a function or service operation is becoming more important, and various types of displays that incorporate state-of-the-art technologies are being proposed. For example, the display may be a flexible display mounted in an electronic device as a roll structure. The flexible display of the roll structure may be extended to a large area by expanding the rolled area in response to a structural transformation of the electronic device.

Even when operating in a sleep state to save power consumption, an electronic device may display useful information such as a time, a date, or a notification via a display (e.g., always on display (AOD)) operating at low-power. However, when the size (or screen area) of the display is changed depending on the structural transformation of the electronic device, the electronic device, in the sleep state, may not control or process the display of information to be matched to the changed size of the display.

Accordingly, it may be advantageous to provide a method of displaying content of an expandable screen area, which is capable of controlling the display of information based on a size (or screen area) change of a display operating at low-power, and an electronic device supporting the same.

SUMMARY

The present disclosure has been made to address the above-mentioned problems and disadvantages, and to provide at least the advantages described below.

In accordance with an aspect of the disclosure, an electronic device is provided that includes a first structure, a second structure, a flexible touch screen display layer, an application processor, at least one display driver integrated circuit operatively connected to the flexible touch screen display layer and the application processor, and a memory operatively connected to the at least one display driver integrated circuit. The first structure includes a first place that includes a first surface and a second surface facing away from the first surface. The second structure includes a second plate facing the second surface of the first plate, a first sidewall perpendicular to the second plate, a second sidewall perpendicular to the first sidewall and the second plate, and a third sidewall perpendicular to the first sidewall and the second plate and parallel to the second sidewall, wherein the second plate, the first sidewall, the second sidewall, and the third sidewall form a trough to accommodate at least part of the first structure, and one side of the trough is open, wherein the first structure is capable of being moved in a first direction parallel to the second plate and the second sidewall between an open state and a closed state with respect to the second structure, wherein the first structure in the closed state is positioned at a first distance from the first sidewall, and wherein the first structure in the open state is positioned at a second distance, which is greater than the first distance, from the first sidewall. The flexible touch screen display layer includes a plane part extending across at least part of the first surface of the first plate and mounted on the first surface, and a bendable portion extending into a space between the first sidewall of the second structure and the first structure from the plane part in the closed state, wherein when the first structure is moved from the closed state to the open state, at least part of the bendable portion may be pulled from the space between the first sidewall of the second structure and the first structure to substantially form a plane between the plane part and the first sidewall of the second structure, when viewed from above the first plate. The memory stores instructions that, when executed while the application processor is inactivated, cause the at least one display driver integrated circuit to display at least one first object in a first area of the plane part of the flexible touch screen display layer in the closed state, and to display at least one second object associated with the first object in a second area of the plane part or in a third area of the bendable portion of the flexible touch screen display layer in the open state, wherein the first area is positioned between the second area and the first sidewall of the second structure, and the third area is positioned between the first area and the first sidewall of the second structure.

In accordance with another aspect of the disclosure, an electronic device includes a first plate; a second plate disposed under the first plate; a rollable module interposed between the first plate and the second plate and disposed to move the first plate between an open state and a closed state with respect to the second plate; a flexible touch screen display disposed to extend from an upper portion of the first plate to a space between the rollable module and the second plate, wherein at least part of the flexible touch screen display is guided by the rollable module and a screen area of the flexible touch screen display is expanded in the open state; at least one display driver integrated circuit; and a processor electrically connected to the flexible touch screen display and the at least one display driver integrated circuit, wherein the at least one display driver integrated circuit is configured to, in a first state where the processor is inactive and the screen area of the flexible touch screen display is not expanded, display at least one first object in a specified first area of the screen area; and in a second state where the processor is inactive and the screen area of the flexible touch screen display is expanded, display at least one second object associated with the first object, in a second area corresponding to an upper portion of the specified first area of the expanded screen area or in a third area corresponding to a lower portion of the specified first area In accordance with another aspect of the disclosure, a method of displaying content of an expandable screen area of an electronic device includes operating, by the electronic device, in an inactive state; in a first state where the electronic device is inactive and a screen area of a display of the electronic device is not expanded, displaying at least one first object in a specified first area of the screen area; and in a second state where the electronic device is inactive and the screen area of the display of the electronic device is expanded, displaying at least one second object associated with the first object in a second area corresponding to an upper portion of the first area of the expanded screen area or in a third area corresponding to a lower portion of the first area.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
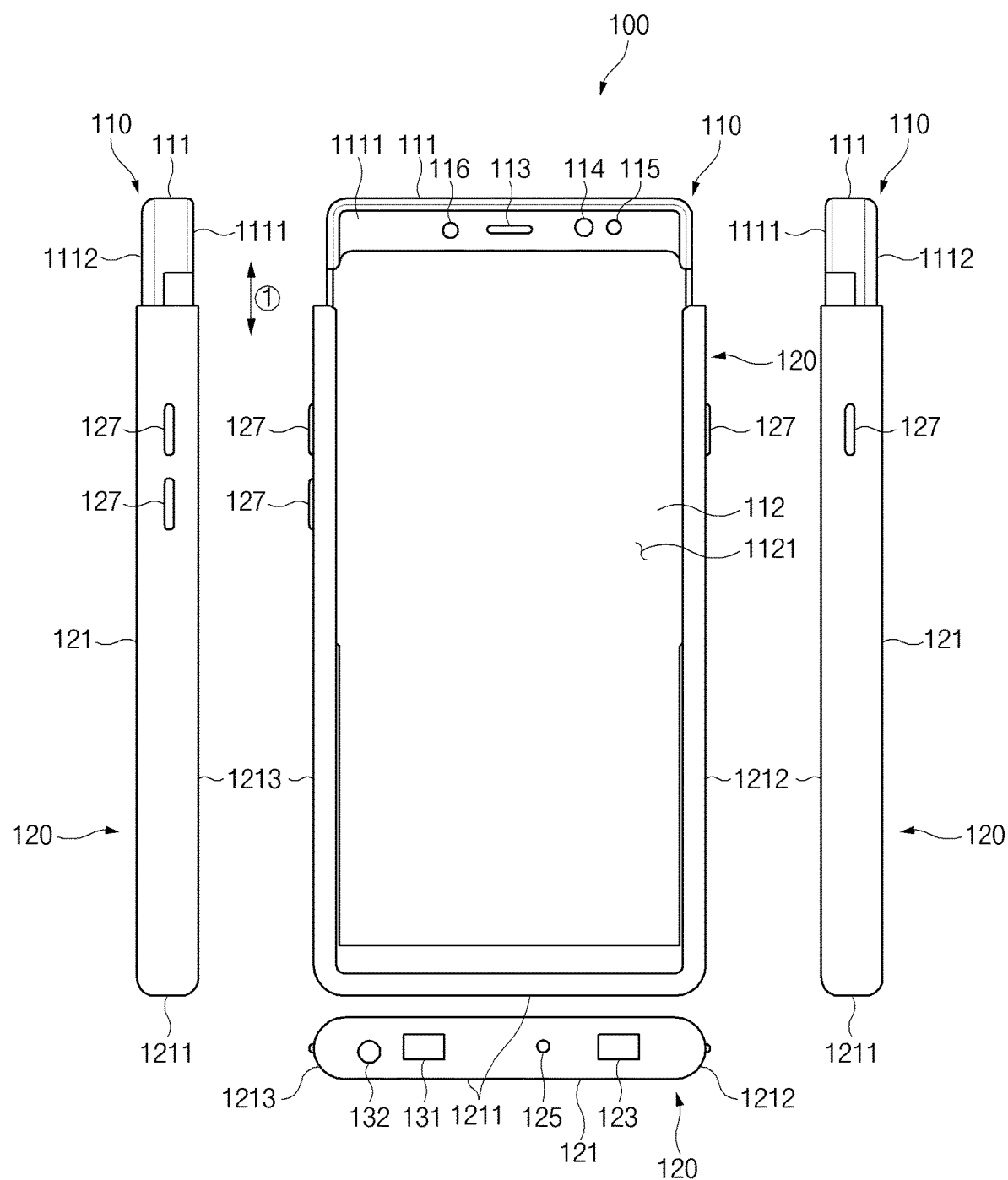
FIG. 1A illustrates a front surface of an electronic device in a closed state, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include", and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of"

operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

The structure of an electronic device to which various embodiments may be applied will be described with reference to FIGS. 1A, 1B, 1C, and 2.

Figure 1B:
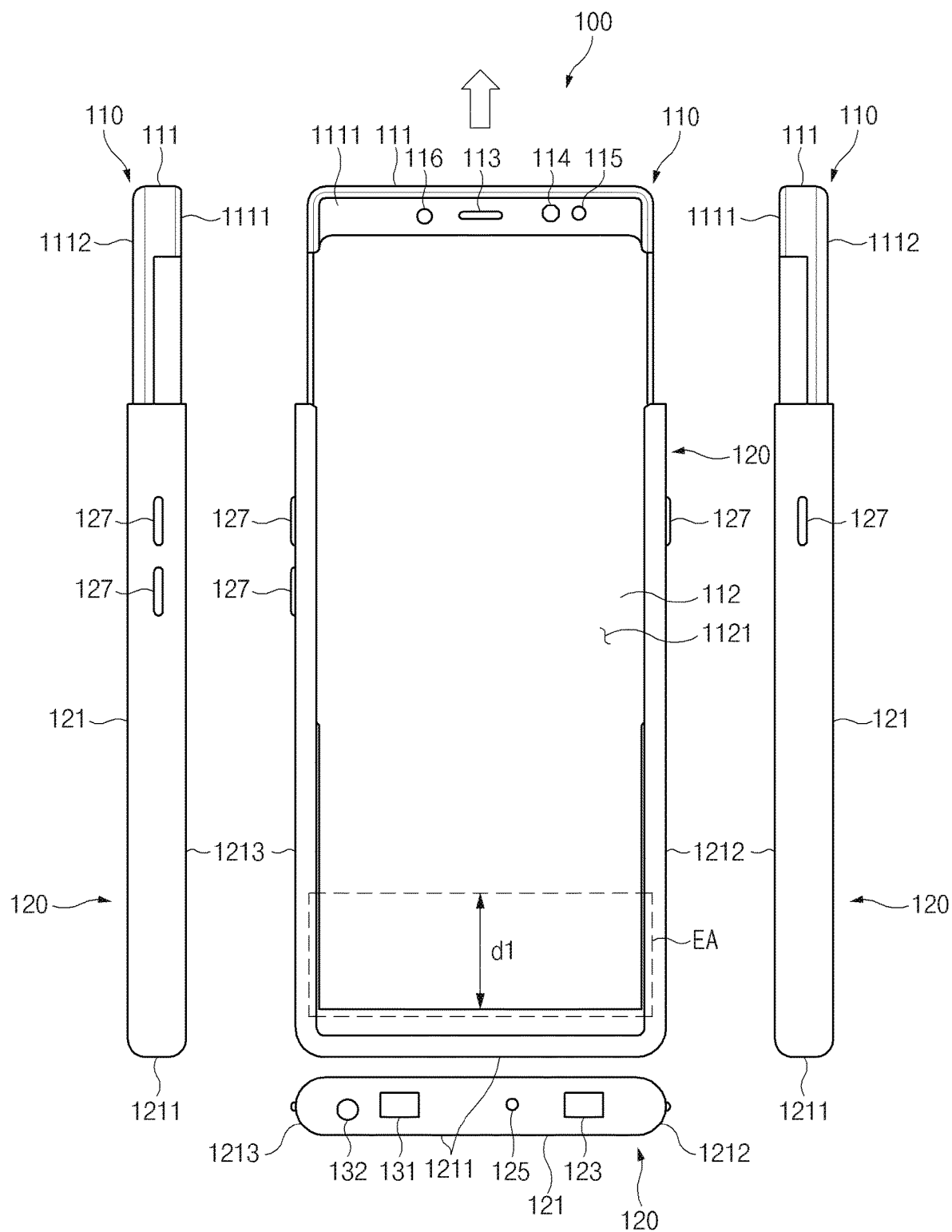
FIG. 1B illustrates a front surface of an electronic device in an open state, according to an embodiment.
Figure 1C:
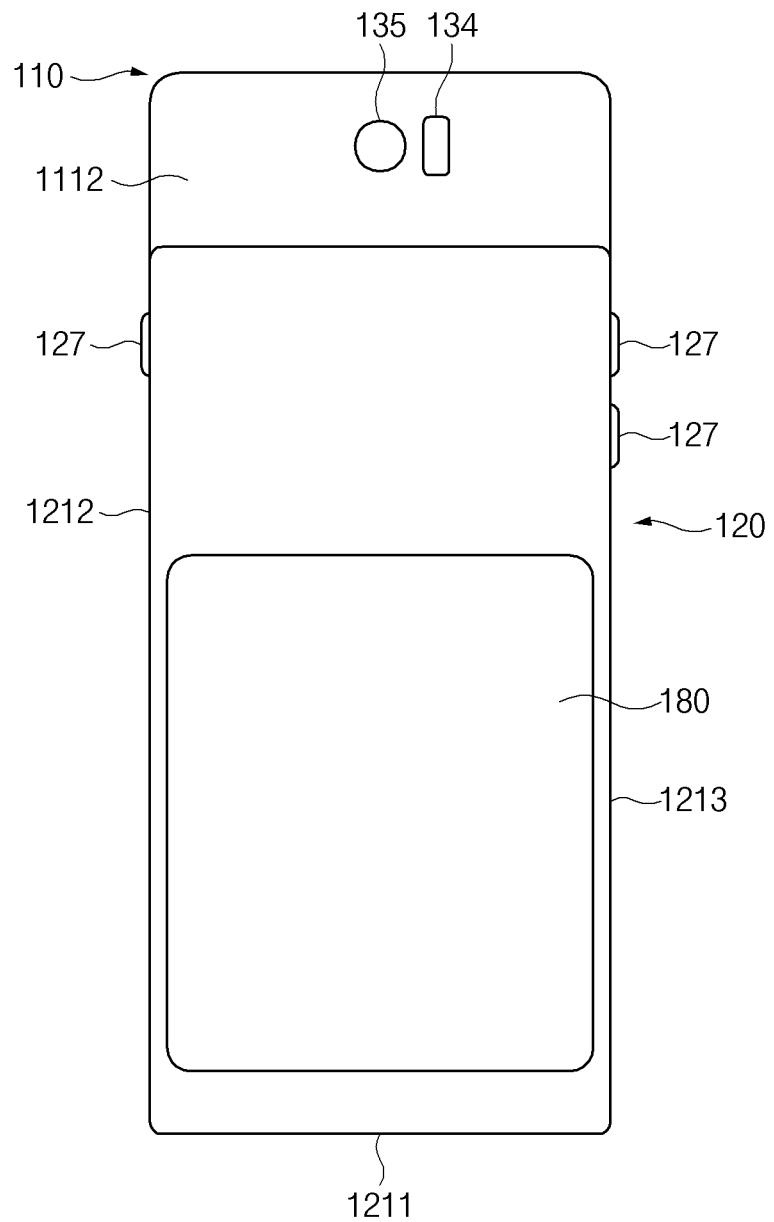
FIG. 1C is a view illustrating a rear surface of an electronic device; according to an embodiment.

FIG. 1A illustrates a front surface of an electronic device in a closed state, according to an embodiment. FIG. 1B illustrates a front surface of an electronic device in an open state, according to an embodiment. FIG. 1C is a view illustrating a rear surface of an electronic device, according to an embodiment.

In FIG. 1A, an electronic device 100 is in a state where a first structure 110 is closed with respect to a second structure 120, and in FIG. 1B, the electronic device 100 is in a state where the first structure 110 is opened with respect to the second structure 120.

Referring to FIGS. 1A, 1B, and 1C, the electronic device 100 includes the first structure 110 and the second structure 120 movably disposed in the first structure 110. According to an embodiment, the first structure 110 may be disposed such that it is possible to expand by a specific distance d1 in a first direction (e.g., ① direction) with respect to the second structure 120.

According to various embodiments, a first plate 111 of the first structure 110 may include a first surface 1111 and a second surface 1112 facing away from the first surface 1111. According to an embodiment, the second structure 120 may include at least one of a second plate 121, a first sidewall 1211 extending to the second plate 121, a second sidewall 1212 extending to the first sidewall 1211 and the second plate 121, a third sidewall 1213 extending to the second plate 121 and parallel to the second sidewall 1212, or a second rear plate 180 (e.g., rear window). According to an embodiment, the second plate 121, the first sidewall 1211, the second sidewall 1212, and the third sidewall 1213 may form the second structure 120 such that one side is opened to accommodate at least part of the first structure 110. According to an embodiment, the second sidewall 1212 or the third sidewall 1213 may be omitted. According to an embodiment, at least part of the second plate 121, the first sidewall 1211, the second sidewall 1212, and the third sidewall 1213 may be formed as an integral structure. According to another embodiment, at least part of the second plate 121, the first sidewall 1211, the second sidewall 1212, and the third sidewall 1213 may be formed as a separate structure. According to an embodiment, the second rear plate 180 may shield at least part of a display 112.

According to an embodiment, the first structure 110 may move in the first direction (e.g., ① direction) parallel to the second plate 121 and the second sidewall 1212 so as to be in an open state and a closed state with respect to the second structure 120. For example, the first structure 110 may be positioned at a first distance from the first sidewall 1211 in the closed state and move to be positioned at a second distance, which is greater than the first distance, from the first sidewall 1211 in the open state.

According to an embodiment, the electronic device 100 may include at least one of the display 112, a first audio module 113, a second audio module 123, a third audio module 125, a first camera module 115, a second camera module 135, an indicator 116 (e.g., a light emitting diode (LED) device), a first sensor module 114, a second sensor module 134, a key input device 127, a first connector hole 131, or a second connector hole 132.

According to an embodiment, the display 112 may include a plane part 1121 extending to cross at least part of the first surface 1111 and disposed on the first surface 1111 and a bendable portion extending to a space between the first sidewall 1211 and the first structure 110 from the plane part 1121 in the closed state. According to an embodiment, when the first structure 110 is moved such that the state of the first structure 110 is changed from the closed state to the open state, at least part of a bendable portion when viewed from above the first plate 111 may move to substantially form a plane between the plane part 1121 and the first sidewall 1211 in the direction of the plane part 1121 by a specific display area. The display 112 may be coupled to or may be disposed adjacent to a touch sensing circuit, a pressure sensor measuring the intensity (or pressure) of the touch, and a digitizer detecting a stylus pen of a magnetic field scheme.

According to an embodiment, the first audio module 113, second audio module 123, and third audio module 125 may include the first speaker hole 113, the second speaker hole 123 or the microphone hole 125. The first speaker hole 113 and/or the second speaker hole 123 may include the receiver hole 113 or the external speaker hole 123. A microphone for receiving external sound may be positioned within the microphone hole 125. In any embodiment, a plurality of microphones may be positioned to make it possible to detect a direction of sound. Alternatively, the first speaker hole 113 and/or the second speaker hole 123 and the microphone hole 125 may be implemented as a single hole, or the electronic device 100 may include a speaker (e.g., a piezo speaker) without the first speaker hole 113 and/or the second speaker hole 123. The receiver hole 113 may be positioned in the first structure 110, and the external speaker hole 123 or the microphone hole 125 may be positioned in the second structure 120. According to another embodiment, the external speaker hole 123 may be disposed on the second surface 1112 of the first plate 111 or may be disposed on the side surface of the first structure 110. According to another embodiment, the microphone hole 125 may be disposed on the side surface of the first structure 110.

According to an embodiment, the first sensor module 114 and/or the second sensor module 134 may generate an electrical signal or a data value which corresponds to an internal operation state of the electronic device 100 or corresponds to an external environment state. For example, the first sensor module 114 and/or the second sensor module 134 may include at least one of the first sensor module 114 (e.g., a proximity sensor) disposed on the first surface 1111 of the first plate 111, an additional sensor module (e.g., a fingerprint sensor) disposed on the second surface 1112 of the first plate 111, and the second sensor module 134 (e.g., a heart rate monitor (HRM) sensor). According to various embodiments, the electronic device 100 may further include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor, in addition to the above-described sensor module.

According to an embodiment, the first camera device 115 and/or the second camera device 135 may include at least one of the first camera device 115 disposed on the first surface 1111 of the first plate 111 and the second camera device 135 disposed on the second surface 1112 of the first plate 111. The first camera device 115 or the second camera device 135 may include at least one of at least one lens, an image sensor, and an image signal processor. According to an embodiment, the second camera device 135 may be disposed on one surface of the second structure 120.

According to an embodiment, the key input device 127 may be disposed on the second sidewall 1212 or the third sidewall 1213 of the second structure 120. According to another embodiment, at least part of the key input device 127 may be disposed on one area of the first structure 110. In an embodiment, the key input device 127 may include a power button or a volume control button. In various embodiments, the electronic device 100 may include not only the key input device 127 disposed on the second sidewall 1212 or the third sidewall 1213, but also a home key button or a touch pad disposed around the home key button.

According to an embodiment, the indicator 116 may be disposed on the first surface 1111 of the first plate 111. For example, the indicator 116 may provide state information of the electronic device 100 in the form of light by including an LED.

According to an embodiment, the first connector hole 131 may accommodate a connector (e.g., a universal serial bus (USB) connector) for transmitting/receiving at least one of power or data to/from an external electronic device, and the second connector hole 132 (or an earphone jack) may accommodate a connector for transmitting/receiving an audio signal to/from the external electronic device. According to an embodiment, the first connector hole 131 or the second connector hole 132 may be formed on the first sidewall 1211 of the second structure 120. Alternatively, the first connector hole 131 or the second connector hole 132 may be formed on the sidewall of the first structure 110.

Figure 2:
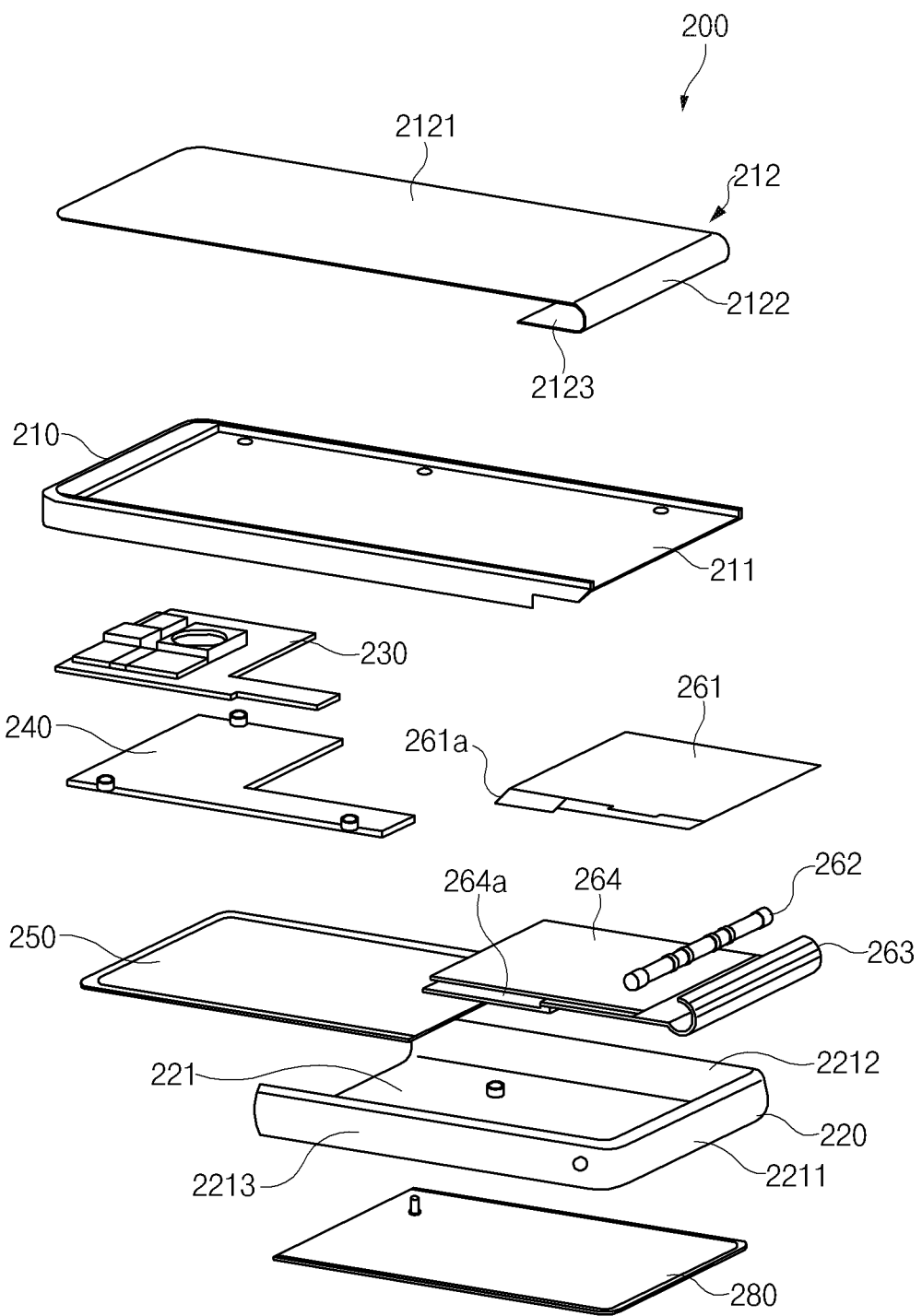
FIG. 2 is a view illustrating an expanded form of an electronic device, according to an embodiment.

FIG. 2 is a view illustrating an expanded form of an electronic device, according to an embodiment.

An electronic device 200 described with reference to FIG. 2 may be at least partly the same as or similar to the electronic device 100 described above in FIG. 1A, 1B, or 1C, and may include other embodiments with respect to at least some of the components.

Referring to FIG. 2, the electronic device 200 includes at least one of a display 212, a first structure 210, a first plate 211, a second structure 220, a second plate 221, a printed circuit board 230, a support member 240 (e.g., a rear case), a second hinge plate 264, and a second rear plate 280 (e.g., a rear window). According to various embodiments, the electronic device 200 may not include at least one (e.g., the support member 240 or a first rear plate 250) of the above-described components or may further include additional components.

The display 212 may include a first surface 2121, a second surface 2122, and a third surface 2123, and the display area of a screen may be changed based on the exposed area. When the electronic device 200 is in the closed state where the first structure 210 is closed with respect to the second structure 220, the first surface 2121 and the third surface 2123 of the display 212 may form a plane, and the second surface 2122 may form a curved surface.

The first structure 210 may include the first plate 211. For example, the first structure 210 may be formed of at least one of a metal material and a non-metal (e.g., polymer) material. The display 212 may be coupled to one surface of the first plate 211, and the printed circuit board 230 may be coupled to the other surface. The first plate 211 may be connected to one side of a multi-bar 263 connected to at least part of the second surface 2122 of the display 212. The first structure 210 may be fixed to the second hinge plate 264.

A first hinge plate 261 may support the multi-bar 263 upon expanding the display 212. The first hinge plate 261 and a first hinge plate fixing part 261a may be formed integrally. The first hinge plate fixing part 261a may be connected to a second hinge plate fixing part 264a provided on the second hinge plate 264. When the display 212 is expanded or reduced, the first structure 210 may be guided and moved via the first hinge plate 261.

A roller 262 may guide or support the multi-bar 263 such that the multi-bar 263 is capable of moving within a specific radius. The roller 262 may be connected to the second hinge plate fixing part 264a or the first hinge plate 261.

The multi-bar 263 may be formed as a plurality of straight bars. The multi-bar 263 may support at least part of the second surface 2122 of the display 212. One side of the multi-bar 263 may be connected to the second hinge plate 264 and the other side thereof may be connected to the first structure 210.

The second hinge plate 264 may support the third surface 2123 of the display 212. The second hinge plate 264 may move in conjunction with the multi-bar 263 such that the screen is capable of being expanded when the display 212 is expanded. The second hinge plate 264 may be implemented independent of the second hinge plate fixing part 264a. The second hinge plate 264 may be fixed to slide inside of the first structure 210.

The second structure 220 may be formed to surround at least part of the first structure 210, the second hinge plate 264, and the multi-bar 263. According to an embodiment, the second structure 220 may include the second plate 221, a first sidewall 2211 extending to the second plate 221, a second sidewall 2212 extending to the first sidewall 2211 and the second plate 221, and a third sidewall 2213 extending to the first sidewall 2211 and the second plate 221 and parallel to the second sidewall 2212. The second structure 220 may form a space for accommodating the antenna in a space in which the multi-bar 263 does not overlap the second structure 220. The second structure 220 may include the second rear plate 280 that shields at least part of the third surface 2123 of the display 212.

When it is not necessary to display information on the third surface 2123 of the display 212, the second rear plate 280 may be formed by including a material that does not pass through light (i.e., an opaque material). For another example, the second rear plate 280 may be formed of a material through which light passes, such that information is capable of being displayed on the third surface 2123 of the display 212. The second rear plate 280 may be integrally formed with the second structure 220.

The support member 240 may be interposed between the printed circuit board 230 and the first rear plate 250.

At least one of a processor, a memory, and an interface may be mounted on the printed circuit board 230. For example, the processor may include at least one of a central processing unit, an application processor, a graphic processing device, an image signal processor, a sensor hub processor, and a communication processor. For example, the memory may include at least one of a volatile memory and a non-volatile memory. For example, the interface may include at least one of a high definition multimedia interface (HDMI), a USB interface, a secure digital (SD) card interface, and an audio interface. The interface may electrically or physically connect, for example, the electronic device 200 to an external electronic device and may include at least one of a USB connector, an SD card/multimedia card (MMC) connector, and an audio connector.

Figure 3:
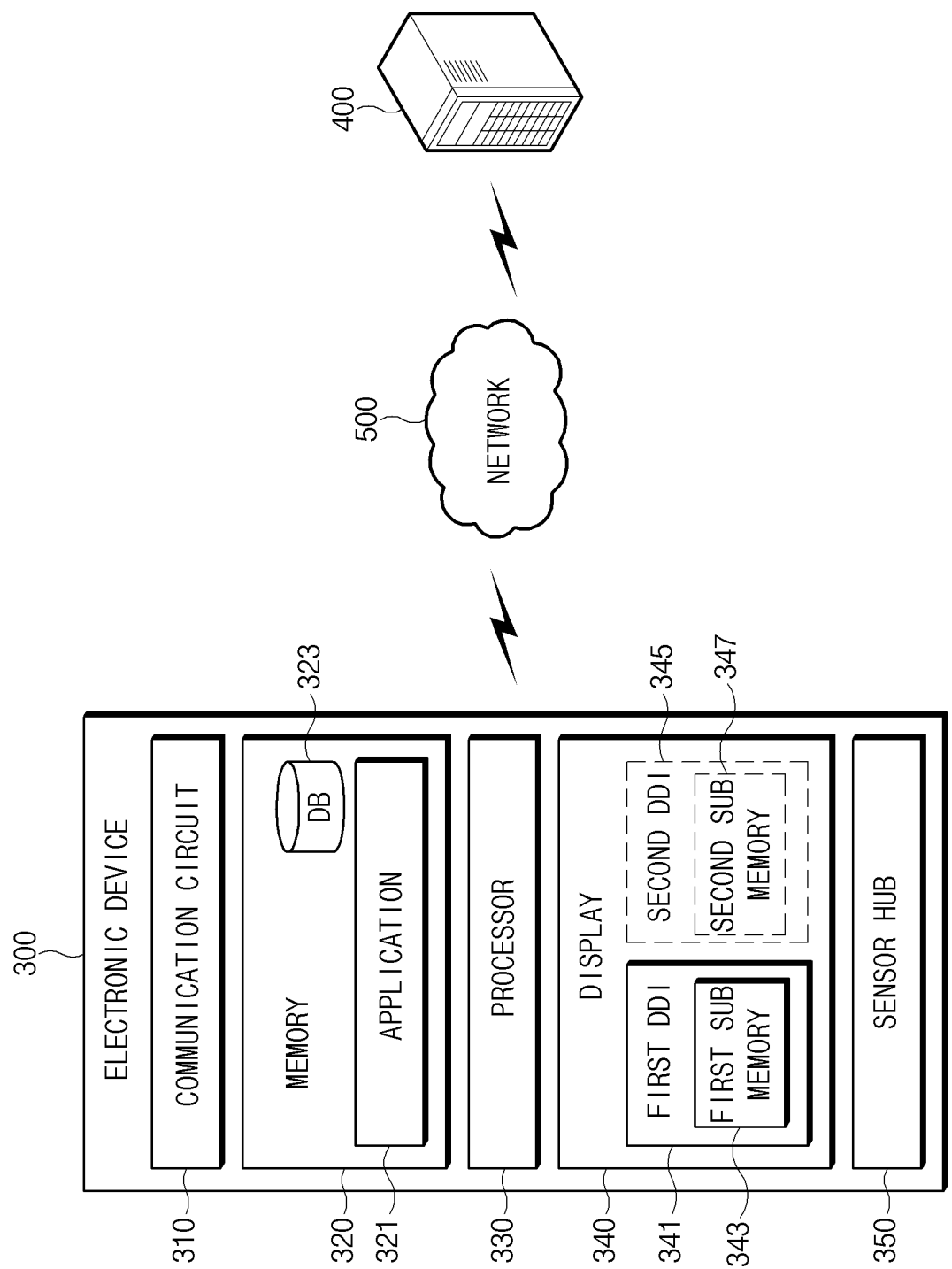
FIG. 3 is a diagram illustrating a configuration of an electronic device, according to an embodiment.
Figure 4:
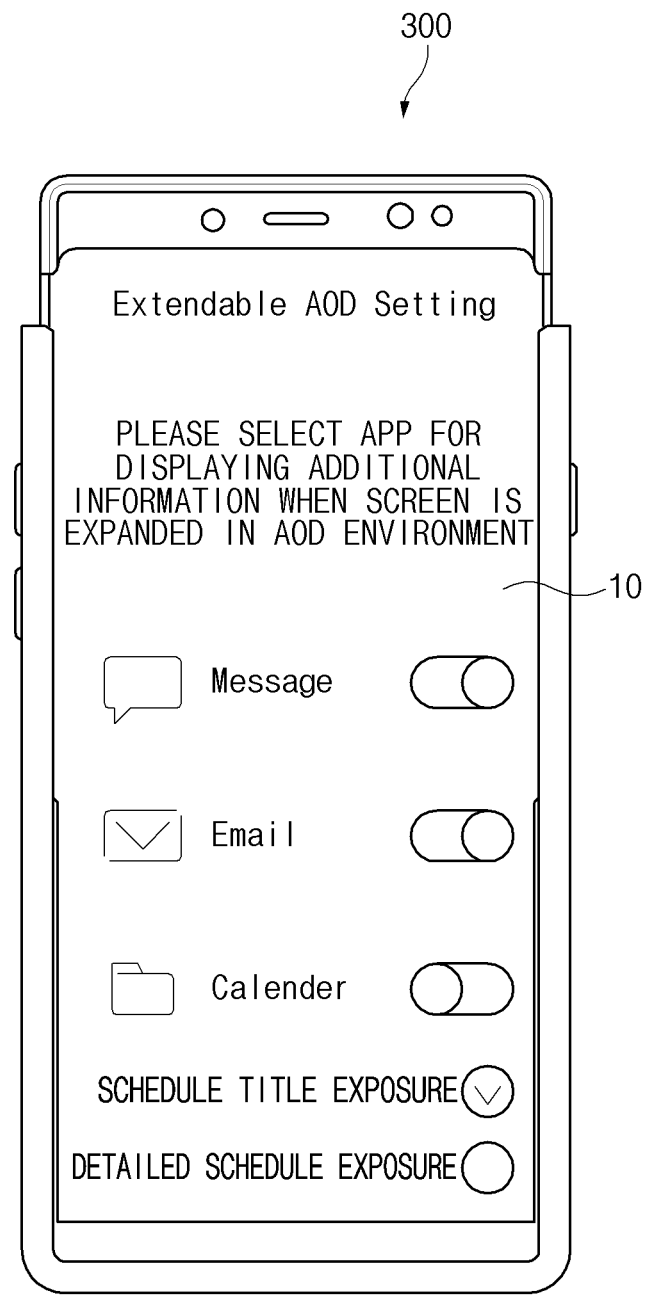
FIG. 4 is a view illustrating a user interface associated with an AOD state setting of an electronic device, according to an embodiment.
Figure 5:
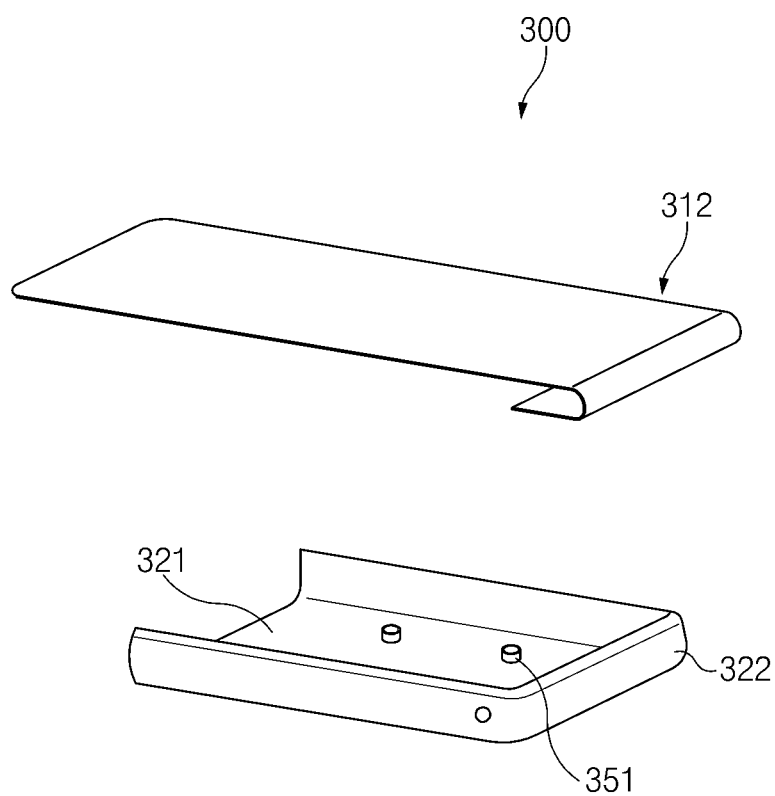
FIG. 5 is a view illustrating a shape for determining a closed state or an open state of an electronic device, according to an embodiment.

FIG. 3 is a diagram illustrating a configuration of an electronic device, according to an embodiment. FIG. 4 is a view illustrating a user interface associated with an AOD state setting of an electronic device, according to an embodiment. FIG. 5 is a view illustrating a shape for determining a closed state or an open state of an electronic device, according to an embodiment.

An electronic device 300, as described in FIG. 3, may include the functional or structural features of the electronic device 100 or 200 described above in FIG. 1A, 1B, 1C, or 2, or may include the same or similar components. Alternatively, the electronic device 300 may further include at least another component that is not mentioned with respect to electronic device 100 or 200.

Referring to FIG. 3, the electronic device 300 includes at least one of a communication circuit 310, a memory 320, a processor 330, a display 340, and a sensor hub 350. According to various embodiments, the electronic device 300 may omit at least one of the above-described components or may further include additional components. For example, the electronic device 300 may further include a power supply device (e.g., battery) that supplies power to the components, or may further include components of an electronic device 1101 to be described with reference to FIG. 11.

In an embodiment, the electronic device 300 may operate in an active state (or a wake-up state) where a user is capable of operating an installed function or service without restrictions, and in an inactive state (or a sleep state) of waiting for the user's operation of the electronic device 300. In the active state, the components of the electronic device 300 may receive sufficient power to perform a corresponding functional operation. For example, the display 340 may display various content corresponding to a user control or specified scheduling information at a high resolution (e.g., full color) by receiving a sufficient amount of power. In the case of the inactive state, at least part of the components of the electronic device 300 may be inactivated not to perform the corresponding functional operation or may receive a minimum amount of power to perform only a limited functional operation. For example, the display 340 may display limited information (e.g., time, date, or an event notification) in the screen area, by operating at low power.

The communication circuit 310 may support communication between the electronic device 300 and at least one external device 400. For example, the communication circuit 310 may establish a network 500 according to a defined protocol with at least one external device 400 and may transmit/receive a signal or data to/from at least one external device 400 based on the connection of the network 500 via wired communication or wireless communication. In various embodiments, the at least one external device 400 may not be limited as long as the at least one external device 400 is capable of transmitting/receiving a signal (e.g., call) or data to/from the electronic device 400 and may include, for example, an electronic device or a server of a similar type as or different from the electronic device 300.

The memory 320 may store data associated with the operation of the electronic device 300 or may store at least one instruction associated with the functional operations of components of the electronic device 300. For example, the memory 320 may store various data received from the at least one external device 400 and may load data or commands stored under the control of the processor 330. Alternatively, the memory 320 may store at least one application 321 that is mounted in a preloaded form in the manufacturing of the electronic device 300 or is downloaded from an online market (e.g., an app store).

In an embodiment, in a state where the display 340 operates at low power depending on the inactive state of the electronic device 300 (i.e., the AOD state), when the screen area of the display 340 is expanded (or when the electronic device 300 of the inactive state is open), at least part of the at least one application 321 may be configured to display information associated with a corresponding application through the specified screen area. In this regard, referring to FIGS. 3 and 4, the processor 330 may display the list of at least one application 321 included in the electronic device 300, on a user interface 10 associated with the system settings of the electronic device 300. The user may select at least one application on the user interface 10, and thus may set brief or detailed information associated with the selected application so as to be displayed via the specified screen area when the electronic device 300 of the inactive state is opened (e.g., the first structure 210 of FIG. 2 is opened with respect to the second structure 220 of FIG. 2) and then the screen area of the display 340 in the AOD state is expanded. In an embodiment, the processor 330 may establish at least one application selected from the user in the user interface 10 into a database 323 and may store the established result in the memory 320.

The processor 330 may be implemented with at least one of a central processing unit, an application processor, or a communication processor and may control the components of the electronic device 300. According to an embodiment, the processor 330 may be activated or inactivated in response to an active state (or a wake-up state) or an inactive state (or a sleep state) of the electronic device 300. The processor 330 in the active state may transmit commands associated with a functional operation to a component of the electronic device 300 or may perform communication operations or data processing. For example, in a state where the electronic device 300 is inactive, the processor 330 in the active state may define a content (e.g., an object such as a text, an image, an icon, or a symbol) to be displayed via the display 340 in the AOD state (e.g., the size, display coordinate value, or color) and may store the related data or command in a first memory 343 and/or second memory 347 included in at least one of a first display driver IC 341 and/or second display driver IC 345.

The display 340 may display various pieces of content. For example, the display 340 may display the operation screen (e.g., a home screen or the execution screen of the application 321) of the electronic device 300 in response to the user control or the specified scheduling information. In an embodiment, in the inactive state (or sleep state) of the electronic device, the display 340 may display content corresponding to specific information (e.g., time, date, or event notification) defined (or set from the user) from the processor 330, by operating in the AOD state. In this operation, the pixels of the display 340 corresponding to the display coordinates of the content may emit the content in a specified first color (e.g., white), and the remaining pixels may be emitted in a specified second color (e.g., black) or may be turned off.

In an embodiment, the display 340 may be implemented with a touch screen display including a display panel, a cover glass, and a touch panel (a touch sensor). The display panel may receive the driving signal corresponding to content information at a specified frame rate and may display the related screen based on the driving signal. The cover glass may be disposed on top surface of the display panel to transmit light according to the screen indication of the display panel. Moreover, a user input (e.g., touch, drag, press, or hovering) by a user's body (e.g., finger) or an electronic pen may be applied to at least one area of the cover glass. The touch panel may detect a signal according to a user input (e.g., electrostatic detection, pressure sensitive detection, infrared detection, or ultrasonic detection) to output the detected signal as an electrical signal and may transmit information about the electrical signal to a touch controller (e.g., a touch IC).

In an embodiment, the display 340 may include at least one first display driver IC 341 and/or second display driver IC 345 that transmits the driving signal to the display panel. The at least one first display driver IC 341 and/or second display driver IC 345 is electrically connected to the display panel and may transmit content data received from the processor 330 (or content data stored in the first memory 343 and/or second memory 347) to the display panel. In this operation, when the electronic device 300 is in an active state (or a wake-up state), the at least one first display driver IC 341 and/or second display driver IC 345 may transmit content data to the display panel at a specified first frame rate; when the electronic device 300 is in an inactive state (or a sleep state), the at least one first display driver IC 341 and/or second display driver IC 345 may transmit content data to the display panel at a second frame rate lower than the first frame rate.

In an embodiment, in a state where the electronic device 300 is inactive, the at least one first display driver IC 341 and/or second display driver IC 345 may operate itself and may control content displayed via the display 340 in the AOD state, using the content data stored in the first memory 343 and/or second memory 347. In this regard, while the electronic device 300 in the inactive state is in the closed or open state, the at least one first display driver IC 341 and/or second display driver IC 345 may include the first display driver IC 341 that controls content display of a specified area (e.g., a first area) in the screen area of the display 340 in the AOD state. Alternatively, while the electronic device 300 in the inactive state is in an open state, the at least one first display driver IC 341 and/or second display driver IC 345 may include the second display driver IC 345 that controls the content display of a screen area (e.g., a second area or a third area), which is different from the screen area managed by the first display driver IC 341, in the screen area of the display 340 in the AOD state. As such, the content data, which is transmitted from the processor 330 and which is to be output through the display 340 in the AOD state, may be stored, in the first memory 343 included in the first display driver IC 341 or in the second memory 347 included in the second display driver IC 345, depending on the display area. The at least one first display driver IC 341 and/or second display driver IC 345 may convert the content data stored in the first memory 343 and/or second memory 347 into a video signal and may transmit the video signal to the display panel, based on the specified scheduling information.

According to various embodiments, the at least one first display driver IC 341 and/or second display driver IC 345 may be integrated into a single display driver IC (e.g., the first display driver IC 341). In this case, the single display driver IC may separately process the content displayed for the screen area (e.g., a first area) managed by the above-described first display driver IC 341 and the screen area (e.g., a second area or a third area) managed by the second display driver IC 345. Furthermore, the single display driver IC may include a first sub memory 343 and a second sub memory 347 for individually storing content data according to each screen area. In various embodiments, the first sub memory and the second sub memory included in the single display driver IC may be implemented as a plurality of modules physically separated. Alternatively, the first sub memory and the second sub memory included in the single display driver IC may be integrated into a single sub memory (e.g., the first sub memory 343), and the single sub memory may include a plurality of storage areas logically separated, for the purpose of individually storing content data according to each screen area. Hereinafter, in a state (or sleep state) where the electronic device 300 is inactive, the at least one content displayed via the display 340 in the AOD state may be referred to as an AOD object.

Referring to FIGS. 3 and 5, the sensor hub 350 may be electrically or operatively connected to the at least one first display driver IC 341 and/or second display driver IC 345 to determine the closed state or open state of the electronic device 300. In this regard, the sensor hub 350 may include a dielectric substance 351 disposed in the lower area (e.g., one area of a second plate 321 of a second structure 322 of the display. The dielectric substance 351 may have a unique dielectric constant different from that of each of the surrounding components, and the sensor hub 350 may determine the closed state or open state of the electronic device 300, by detecting the coordinates or pixel change in the display that contacts or approaches the dielectric substance 351 via a touch controller (e.g., touch IC). The sensor hub 350 may transmit the determined information to the at least one first display driver IC 341 and/or second display driver IC 345. The sensor hub may also be referred to as a sensor circuit or a low-power processor.

Figure 6A:
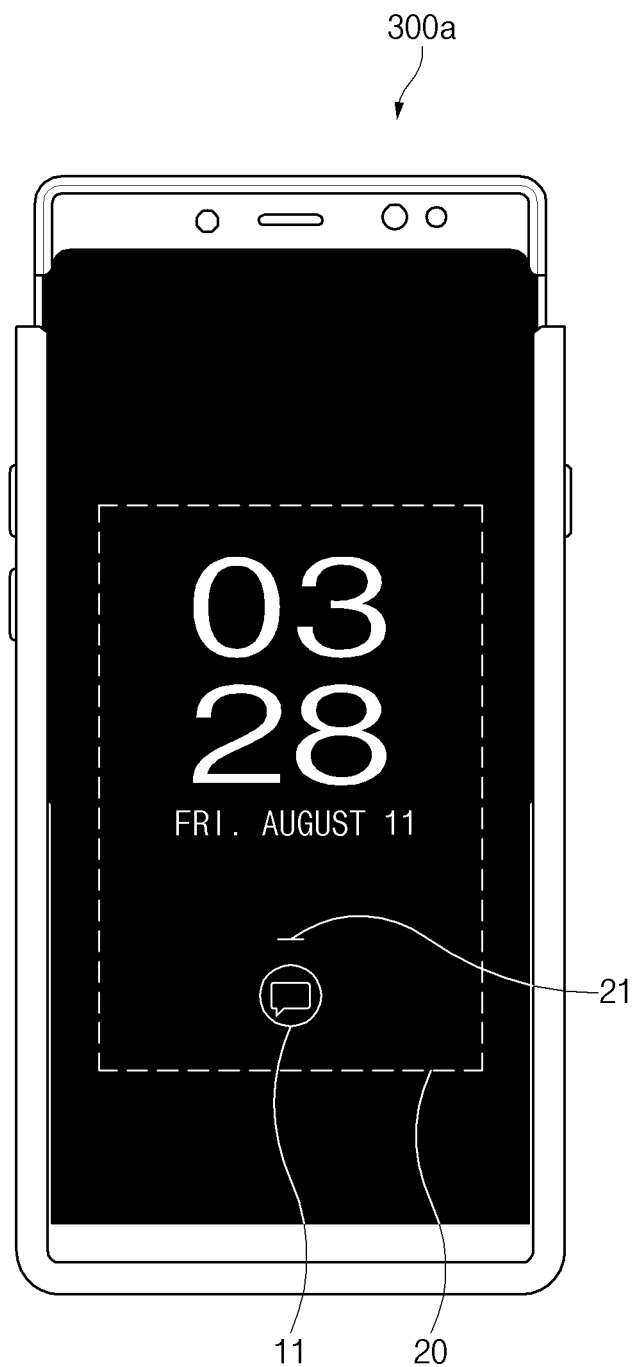
FIG. 6A is a view illustrating an AOD object display form of an electronic device in a closed state, according to an embodiment.
Figure 6B:
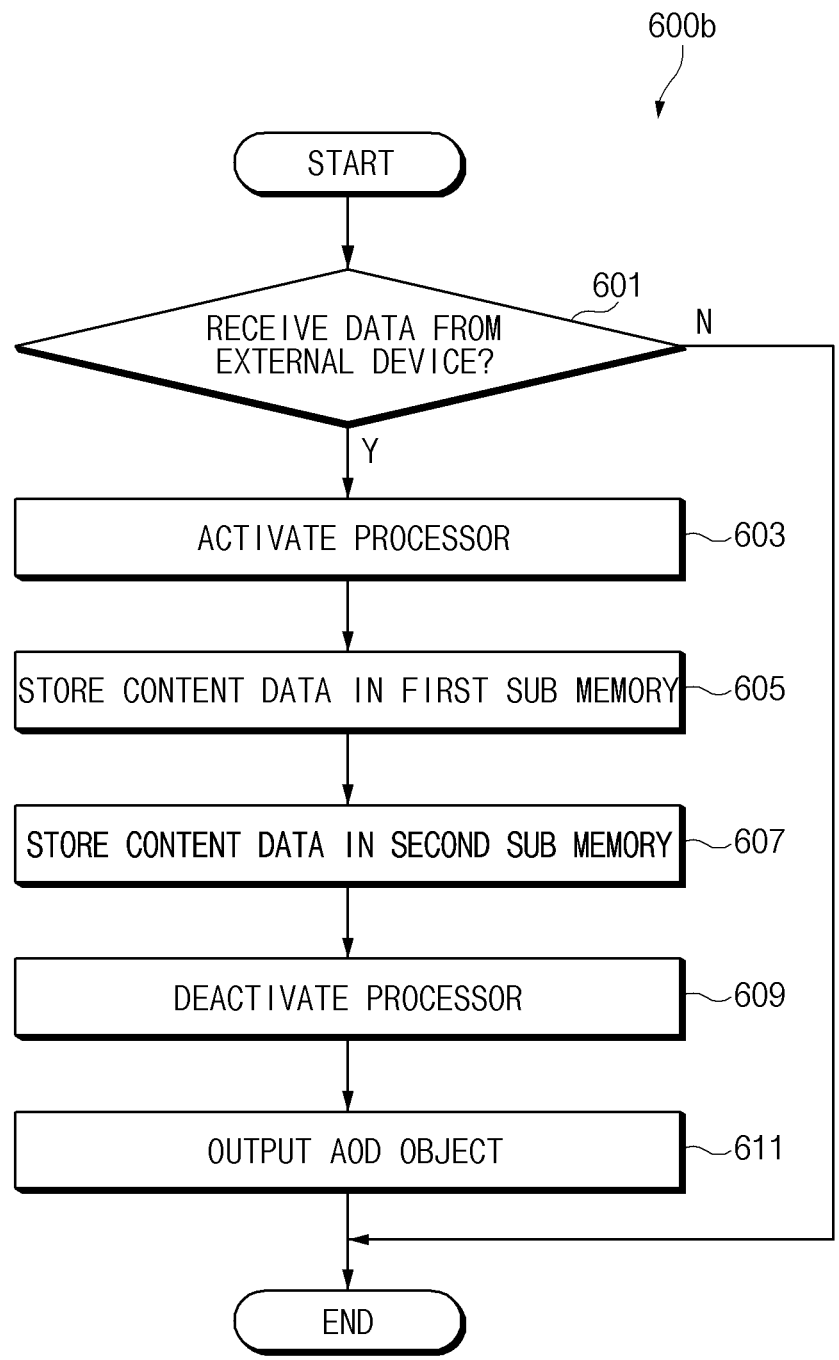
FIG. 6B is a flowchart illustrating an AOD object displaying method of an electronic device in a closed state, according to an embodiment.

FIG. 6A is a view illustrating an AOD object display form of an electronic device in a closed state, according to an embodiment. FIG. 6B is a flowchart illustrating an AOD object displaying method 600b of an electronic device in a closed state, according to an embodiment.

In FIGS. 6A and 6B, an electronic device 300a may be in an inactive (or a sleep state) state and a closed state (e.g., a state where the first structure 210 of FIG. 2 is in a closed state with respect to the second structure 220 of FIG. 2).

Referring to FIG. 6A, the electronic device 300a may output an AOD object (e.g., a text or a number) such as a time or date, via the display 340 in the AOD state. For example, the first display driver IC 341 of FIG. 3 that takes the place of a processor 330 of FIG. 3 may be inactivated depending on the inactive state of the electronic device 300a and may display the AOD object in a specified first area 20 of the screen area of the display 340 in the AOD state, using content data stored in the first memory 343 of FIG. 3. In an embodiment, the various areas (e.g., a second area, a third area, and a fourth area) described below may be logically separated virtual areas, in addition to the first area 20.

Referring to FIGS. 6A and 6B, in operation 601, in a state of displaying an AOD object, the electronic device 300a receives data (e.g., a message) associated with the operation of an application (e.g., a message application) included in the electronic device 300a, from the at least one external device 400 of FIG. 3.

In operation 603, the processor 330 in an inactive state is temporarily transitioned to an active state with regard to the processing of the received data. The activated processor 330 may identify the application associated with the received data.

In operation 605, the processor 330 in the active state transmits the first content (e.g., a message application icon) data corresponding to the identified application to the first memory 343 to provide a notification of the data reception, and the first content data is stored in the first memory 343.

In operation 607 and operation 609, after the processor 330 in an active state reads out the received data and then transmits the corresponding second content (e.g., a message text) data to the second memory 347 of FIG. 3, the second content is stored in the second memory 347 and the processor 330 is transitioned to the inactive state again.

In operation 611, as the processor 330 transitions to the inactive state, the first display driver IC 341 that processes the output of data stored in the first memory 343 displays (outputs) a first AOD object 11 (e.g., a message application icon) via the display 340. For example, the first display driver IC 341 may output the first AOD object 11 in one area within the first area 20, by transmitting the first content data stored in the first memory 343 to the display panel.

In an embodiment, when the application identified by the processor 330 in the active state corresponds to the application (e.g., an application configured to display additional information through a specified area, when the electronic device 300a of the inactive state is opened and the screen area of the display 340 in the AOD state is expanded) included in the database 323 of the memory 320 of FIG. 3, the first AOD object 11 may be processed with a specified display effect (e.g., blink processing) or may include a first display object 21 (e.g., bar) of a specified shape.

In an embodiment, the specified user input may be applied to the first AOD object 11 displayed in the first area 20. In this operation, the electronic device 300a in the inactive state (or sleep state) may detect a user input applied to the first AOD object 11, based on the minimum power consumption. The user input may include, for example, at least one touch and at least one touch release. In this regard, data (e.g., a digital value) of the at least one touch and the at least one touch release of the display coordinates of the first AOD object 11 may be stored in advance in a register (e.g., a storage area where the specified data is capable of being written) included in the touch controller (e.g., touch IC). The touch controller may compare the data of the user input applied to the first AOD object 11 with data of the at least one touch and the at least one touch release stored in the register; when the data of the user input corresponds to the data of at least one touch and at least one touch release, the touch controller may transmit the data of the user input to the processor 330 in the inactive state. As such, the processor 330 in the inactive state may be transitioned to the active state to control the electronic device 300a to switch to the active state (or a wake-up state). Furthermore, the processor 330 transitioned to the active state may release the AOD state of the display 340 and may display the execution and associated screen (e.g., dialog interface) of the identified application at a high resolution (e.g., full color) in connection with the processing of the user input applied to the first AOD object 11.

Figure 7A:
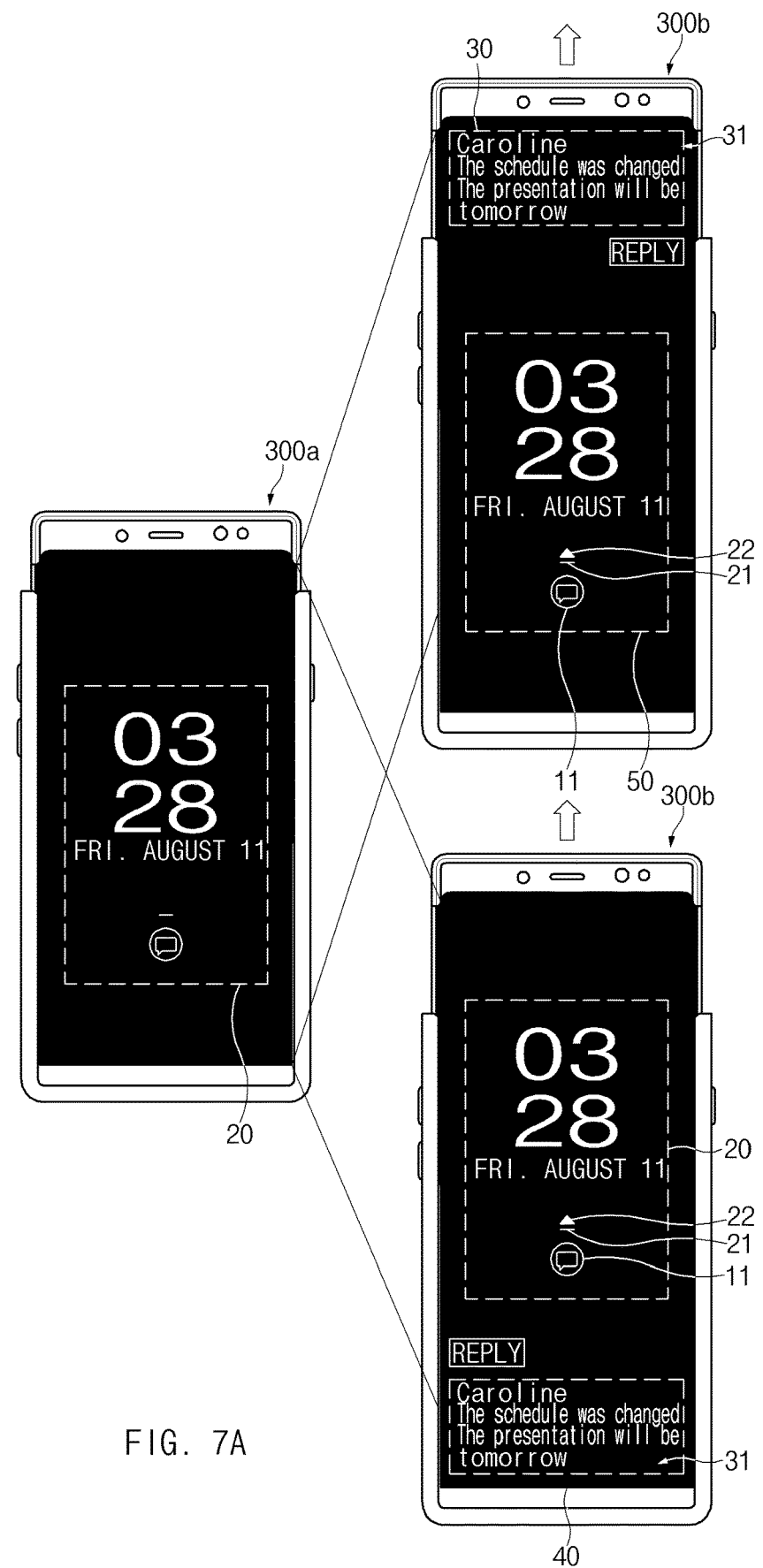
FIG. 7A is a view illustrating an AOD object display form of an electronic device in an open state, according to an embodiment.

FIG. 7A is a view illustrating an AOD object display form of an electronic device in an open state, according to an embodiment.

In FIG. 7A, the electronic device 300a and electronic device 300b may be in an inactive state (or a sleep state), the electronic device 300a may be in a closed state; and the electronic device 300b may be in an open state.

The electronic device 300b in the open state may display an AOD object such as time or a date, in a fourth area 50, the location of which is lower than that of the first area 20 of the electronic device 300a in the closed state. Alternatively, the electronic device 300b in the open state may display the AOD object in the first area 20, the location of which is the same as that of the first area 20 of the electronic device 300a in the closed state. For example, the first display driver IC 341 of FIG. 3 may display the AOD object in the fourth area 50 or the first area 20, using the content data stored in the first memory 343 of FIG. 3.

In an operation of displaying an AOD object such as the time or date, the electronic device 300b in the open state may receive data (e.g., a message) associated with the operation of an application (e.g., a message application), from at least one external device 400 of FIG. 3. In this case, the processor 330 of FIG. 3 in the inactive state may be temporarily transitioned to the active state to identify the application associated with the received data. For the purpose of providing a notification of the data reception, after the activated processor 330 transmits the first content (e.g., message application icon) data associated with the identified application to the first sub memory 343 and then transmits the second content (e.g., a message text) data according to the reading of the received data, to the second memory 347 of FIG. 3, the activated processor 330 may be transitioned to the inactive state.

As the processor 330 transitions to the inactive state, the first display driver IC 341 may output the first AOD object 11 (e.g., a message application icon) in one area within the fourth area 50 or the first area 20, by transmitting the first content data stored in the first memory 343 to the display panel. Furthermore, as the second display driver IC 345 of FIG. 3 receives information or a signal indicating that electronic device 300b is in an open state, from the sensor hub 350 of FIG. 3, the second display driver IC 345 of FIG. 3 may display a second AOD object 31 (e.g., a message text) in a second area 30 corresponding to the upper portion of the fourth area 50 or a third area 40 corresponding to the lower portion of the first area 20. In an embodiment, when the second AOD object 31 is displayed in the second area 30 or the third area 40, a second display object 22 (e.g., an arrow) of a specified shape may be further displayed in an adjacent area of the first display object 21 (e.g., bar) included in the first AOD object 11. According to an embodiment, the display of the second display object 22 may indicate that the second AOD object 31 of the application associated with the first AOD object 11 is displayed in the second area 30 or the third area 40.

The second AOD object 31 may be displayed when data associated with the operation of an application (e.g., a message application) is received from at least one external device 400, in a state where the electronic device 300b in the open state displays an AOD object such as a time or date in the fourth area 50 or the first area 20. However, the second AOD object 31 may be displayed when the electronic device 300a transitions to the open state, in a state where the electronic device 300a of FIG. 6A in the closed state receives data associated with the operation of the application from the at least one external device 400 to display the first AOD object 11 of FIG. 6A.

In various embodiments, the first display driver IC 341 and the second display driver IC 345 may be integrated into a single display driver IC (e.g., the first display driver IC 341). In this case, after the single display driver IC displays the AOD object (e.g., a text, a number, a symbol, or an icon indicating time, a date, or an event notification) in the fourth area 50 or the first area 20, using the content data stored in the first memory 343, the single display driver IC may display the AOD object (e.g., the content of the application associated with the event notification) in the second area 30 or the third area 40, using the content data stored in the second memory 347 based on the state information of the electronic device 300b received from the sensor hub 350.

Figure 7B:
FIG. 7B is a view illustrating an AOD object switch form of an electronic device in an open state, according to an embodiment.
Figure 7C:
FIG. 7C is a view illustrating an AOD object operation form of an electronic device in an open state, according to an embodiment.
Figure 7D:
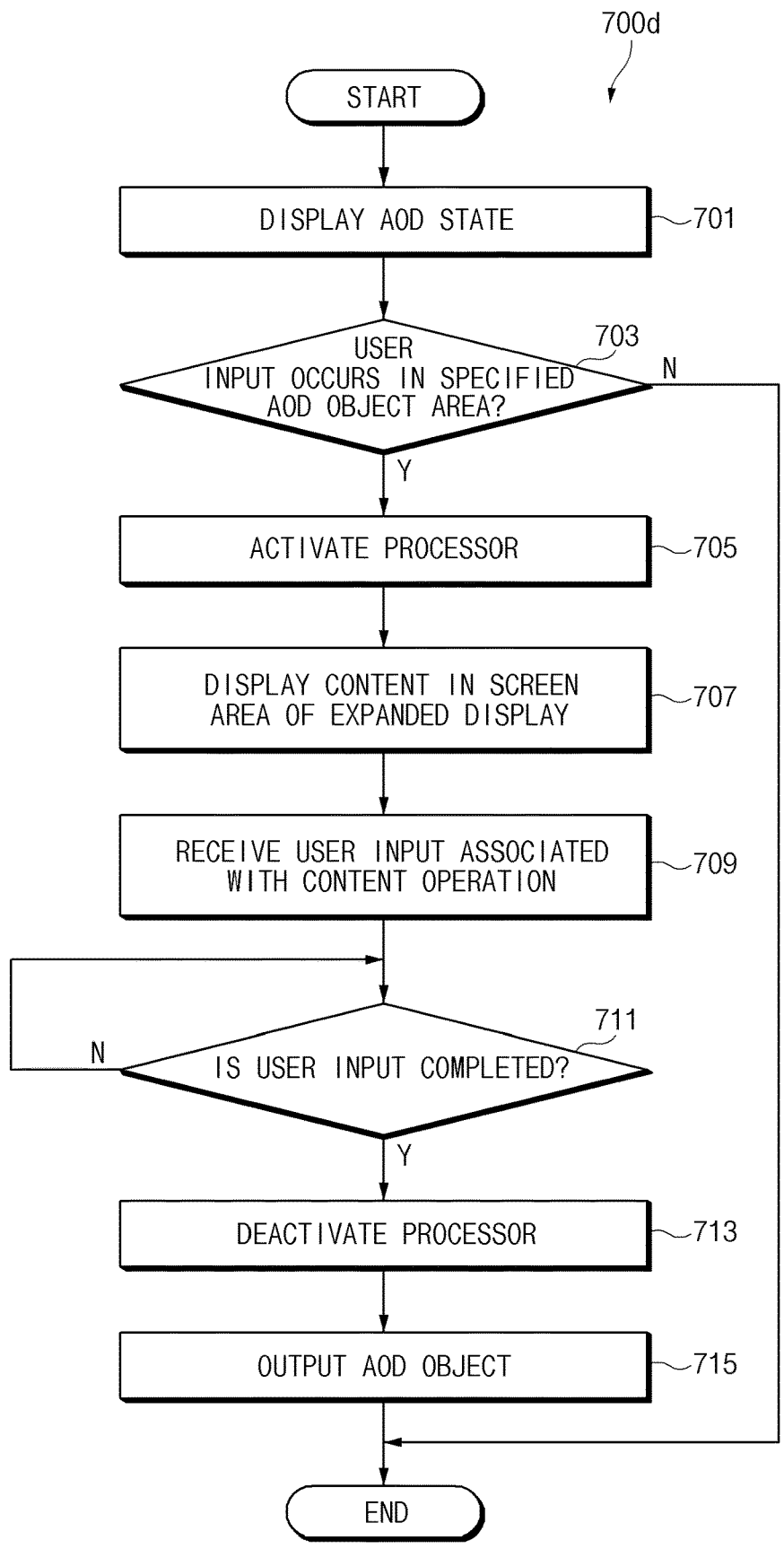
FIG. 7D is a flowchart illustrating a method of switching and operating an AOD object of an electronic device in an open state, according to an embodiment.

FIG. 7B is a view illustrating an AOD object switch form of an electronic device in an open state, according to an embodiment. FIG. 7C is a view illustrating an AOD object operation form of an electronic device in an open state, according to an embodiment. FIG. 7D is a flowchart illustrating a method 700d of switching and operating an AOD object of an electronic device in an open state, according to an embodiment.

In FIGS. 7B, 7C, and 7D, the electronic device 300a and the electronic device 300b may be in an inactive state (or a sleep state), the electronic device 300a may be in a closed state; and the electronic device 300b may be in an open state. Furthermore, according to FIGS. 7B, 7C, and 7D, the above-described second AOD object (e.g., a message text) is displayed in the second area substantially corresponding to the upper end of the screen area of the expanded display.

Referring to FIG. 7B, the first display driver IC 341 of FIG. 3 may output an AOD object such as time, a date, or an event notification in the screen area of the display 340 of FIG. 3 in an AOD state, depending on the inactive state of the electronic device 300a. In this operation, when the electronic device 300a in the closed state transitions to the open state, the second display driver IC 345 of FIG. 3 may display the second AOD object 31 (e.g., a message text) of the application associated with the event notification (e.g., message application icon) in the second area 30 in a state where the inactive state of the processor 330 is maintained.

In an embodiment, in a state where the second AOD object 31 is output by the second display driver IC 345, the electronic device 300b may receive other data (e.g., a new message) associated with the operation of the application, from at least one external device 400 of FIG. 3. In this case, the processor 330 of FIG. 3 in the inactive state may be temporarily activated to read out the other data and may transmit the content data (e.g., a new message text) to the second sub memory 347 of FIG. 3 according to the read out. The second display driver IC 345 may update the second area 30 by displaying a third AOD object 32 in the second area 30 using the content data stored in the second memory 347.

In an embodiment, in an operation of displaying the second AOD object 31, the second display driver IC 345 may further display a fourth AOD object 41 (e.g., a tap button) in an area adjacent to the second area 30. The content data for the fourth AOD object 41 may be stored together in an operation in which the processor 330 in the active state stores the content data associated with the second AOD object 31 in the second memory 347.

According to an embodiment, when the specified user input is applied to the fourth AOD object 41, the operation of the application associated with the second AOD object 31 may be supported. In this regard, data (e.g., a digital value) of at least one touch and at least one touch release of the display coordinates of the fourth AOD object 41 may be stored in advance in a register included in the touch controller (e.g., touch IC), similar to the method of detecting a user input to the first AOD object 11 of FIG. 6A. The touch controller may compare the data of the user input applied to the fourth AOD object 41 with the touch and touch release data stored in the register; when the data of the user input corresponds to the touch and touch release data, the touch controller may transmit the data of the user input to the processor 330 in an inactive state. The processor 330 activated based on the user input data from the touch controller may switch the second AOD object 31 (or the third AOD object 32) displayed in the second area 30 to content 60 (e.g., a dialog interface) supported by a related application (e.g., a message application). In this operation, the processor 330 in the active state may control the display 340 of FIG. 3 (or a display panel) such that the content 60 is displayed in a non-AOD state (or at high resolution).

Referring to FIG. 7C, the content 60 displayed in the second area 30 may include an input field 61 in which a user input is capable of being written. In an embodiment, when a specified user input (e.g., a long press) is applied to the input field 61, the processor 330 in the active state may output a software input panel (SIP) keyboard 62 in a non-AOD state. The processor 330 in the active state may reflect and display 63 the user input received through the SIP keyboard 62, incorporating it into the content 60.

In an embodiment, when the reception of a user input through the SIP keyboard 62 is completed, the processor 330 in the active state may transmit user input data to the second memory 347. For example, after the processor 330 in the active state reconfigures the user input data into an AOD object (or the third AOD object 32) in the form the same as or similar to the second AOD object 31 (e.g., font color, font design, or font size) and then transmits the reconfigured result to the second memory 347, the processor 330 in the active state may be transitioned to an inactive state. As the processor 330 is inactivated, the content 60 displayed in the second area 30 may disappear; the second display driver IC 345 may update the second area 30 by further displaying a fifth AOD object 33 in the second area 30, using the content data of the reconfigured AOD object stored in the second memory 347.

As described above with reference to FIGS. 7B, 7C, and 7D, in operation 701, as the electronic device 300a is in an inactive state, the first display driver IC 341 outputs (i.e., displays) an AOD object such as a time, date, or event notification via the display 340 in an AOD state.

In an embodiment, when the electronic device 300a in the closed state transitions to the open state, the second display driver IC 345 may display the second AOD object 31 (e.g., a message text) of the application associated with the event notification (e.g., a message application icon) in the specified second area 30 of the screen area of the display 340 in the AOD state, using the content data stored in the second sub memory 347. Moreover, the second display driver IC 345 may display the fourth AOD object 41 supporting the operation of the application, in an area adjacent to the second area 30.

In operation 703, the touch controller (e.g., touch IC) determines whether a user input to the fourth AOD object 41 occurs. For example, the touch controller may determine the user input applied to the fourth AOD object 41 by comparing the data of an arbitrary user input applied to the screen area of the display 340 in the AOD state with the touch data of the display coordinates of the fourth AOD object 41.

When it is determined that a user input is applied to the fourth AOD object 41, in operation 705, the processor 330 that is in an inactive state is activated depending on the inactive state of the electronic device 300b.

In operation 707, the activated processor 330 switches and displays the second AOD object 31 displayed in the second area 30 into the content 60 (e.g., a dialog interface in a non-AOD state) supported by the application, in response to the user input applied to the fourth AOD object 41.

In operation 709, the activated processor 330 receives a user input to operate the content 60 (or application). In this regard, the activated processor 330 may output the SIP keyboard 62 in a non-AOD state in response to a specified user input (e.g., long press) applied to the input field 61 of the content 60 and may receive a user input via the SIP keyboard 62. The activated processor 330 may reflect and display the received user input into the content 60.

In operation 711, the activated processor 330 determines whether the reception of a user input via the SIP keyboard 62 is completed. For example, when a user input is not applied to the SIP keyboard 62 during a specified time or when a specified hardware key (e.g., a power key) is manipulated by a user after receiving the user input, the activated processor 330 may determine that the user input via the SIP keyboard 62 is completed. The processor 330 in the active state may reconfigure the data of the user input into content data of the AOD object type and may store the reconfigured result in the second memory 347.

In operation 713, as it is determined that the user input to operate the content 60 (or application) is completed, the processor 330 in the active state is transitioned to an inactive state.

In operation 715, the content 60 disappears in response to the deactivation of the processor 330, and the fifth AOD object 33 according to the user input is added and displayed in the second area 30. For example, the second display driver IC 345 may update the second area 30 by displaying the fifth AOD object 33 according to the user input, in the second area 30 using the content data reconfigured in the form of the AOD object stored in the second memory 347.

Figure 8A:
FIG. 8A is a view illustrating an AOD object switch form of an electronic device in an open state, according to an embodiment.
Figure 8B:
FIG. 8B is a view illustrating an AOD object switch form of an electronic device in an open state, according to an embodiment.
Figure 8C:
FIG. 8C is a view illustrating an AOD object switch form of an electronic device in an open state, according to an embodiment.

FIGS. 8A, 8B, and 8C are views illustrating an AOD object switch form of an electronic device in an open state, according to an embodiment.

In FIGS. 8A, 8B, and 8C, the electronic device 300a and the electronic device 300b may be in an inactive state (or a sleep state), the electronic device 300a may be in a closed state; and the electronic device 300b may be in an open state. Furthermore, in FIGS. 8A, 8B, and 8C, it may be understood that the AOD object (e.g., a message text, a weather information text, a number or a symbol, a schedule information text, or a number) output in response to the opening of the electronic device 300b is displayed in the second area substantially corresponding to the upper end of the screen area of the expanded display.

Referring to FIG. 8A, in a state where the electronic device 300a is closed and inactive, the first display driver IC 341 of FIG. 3 may display the AOD content, such as a text, a number, a time or a date, in the specified first area 20 of the screen area of the AOD state display 340 of FIG. 3 using the content data stored in the first memory 343 of FIG. 3. In this operation, the electronic device 300a may receive first data (e.g., a message) associated with the operation of the first application (e.g., a message application) from a first external device. Moreover, the electronic device 300a may receive second data (e.g., weather information) associated with the operation of the second application (e.g., a weather application) from a second external device, at a similar point in time as when the first data is received, or after an arbitrary time from reception of the first data. In various embodiments, the sequence for receiving the first data and the second data may be changed.

In an embodiment, the processor 330 of FIG. 3 in an inactive state may be temporarily activated to process the data or to provide a notification of data reception. For example, when the second data is received in an operation of processing the first data, the activated processor 330 may process both the first data and second data during the active state. Alternatively, when there is an interval between the reception of the first data and the reception of the second data, the activated processor 330 may be transitioned to an inactive state after processing the first data and may be activated again at the time of the reception of the second data, and then may be transitioned to the inactive state after processing the second data. The processor 330 in the active state may identify the applications associated with the received pieces of data with regard to the processing of the first and second data and may transmit first content (e.g., a message application icon and a weather application icon) data of each of the identified applications, to the first memory 343 of FIG. 3. Furthermore, the processor 330 in an active state may read the received data to transmit the second content (e.g., a message text and a weather information text, a number, or a symbol) data of each of the first data and the second data to the second memory 347 of FIG. 3, and then may be transition to an inactive state.

In an embodiment, as the processor 330 is transitioned to an inactive state, the first display driver IC 341 may output a plurality of first AOD objects 11 and 12 (e.g., a message application icon 11 and a weather application icon 12) in one area within the first area 20 using the pieces of first content data stored in the first memory 343. Each of the plurality of first AOD objects 11 and 12 may be processed with a specified display effect (e.g., blink processing) or may include first display objects 21a and 21b of a specified shape. In an embodiment, the user of an electronic device 300a may apply a user input to a specific first AOD object (e.g., a weather application icon 12) to identify one of the received first data and the received second data. In this case, the first display driver IC 341 may further display a second display object 22a (e.g., an arrow) of a specified shape in the adjacent area of the first display object 21a included in the specific first AOD object 12, using the content data stored in the first memory 343.

According to an embodiment, after receiving the user input, the electronic device 300a in the closed state may be transitioned to the open state by a user's manipulation. In this case, the second display driver IC 345 of FIG. 3 may transmit the second content (e.g., a weather information text, a number, or a symbol) data associated with the specific first AOD object 12, to which a user input is applied, from among pieces of second content (e.g., a message text, a weather information text, a number or a symbol) data stored in the second memory 347, to the display panel based on the reception of the information or signal indicating that the electronic device 300b is in an open state from sensor hub 350 of FIG. 3. As such, a sixth AOD object 34 (e.g., a weather information text, a number, or a symbol) according to the processing of the second content data may be displayed in the second area 30.

In an embodiment, the user of the electronic device 300b may apply a specified user input (e.g., a long press) to one area within the second area 30 to operate an application (e.g., a weather application) associated with the sixth AOD object 34. In this case, the above-described touch controller (e.g., touch IC) may compare the data of the user input with touch data (e.g., a digital value) stored in advance in a register with respect to the second area 30; when the data of the user input corresponds to the touch data, the touch controller may transmit the user input data to the processor 330 in the inactive state. The processor 330 in the inactive state may be activated based on user input data transmitted from the touch controller and may display content 70, which is supported by the application (e.g., a weather application), in the second area 30 in a non-AOD state (or high resolution).

Referring to FIG. 8B, as described above, when pieces of data (e.g., first data (a message) and second data (weather information)) are received from a plurality of external devices (e.g., the first external device and the second external device), the second area 30 may be composed of a plurality of sections. Switching between the plurality of sections may be specified by a plurality of seventh AOD objects 35 displayed in one area within the second area 30. For example, the plurality of seventh AOD objects 35 may be respectively mapped to the plurality of sections; when a section is switched depending on user control, the seventh AOD object 35 corresponding to the focused section may be processed with a specified display effect (e.g., blink processing or color processing).

According to an embodiment, in an operation of displaying the sixth AOD object 34 associated with a first AOD object 12 selected by a user in the second area 30, the user may switch the section of the second area 30. For example, the user may perform a specified user input (e.g., sweep in one direction) within the second area 30 or may select (e.g., touch) one of the plurality of seventh AOD objects 35 to switch the section of the second area 30. In this case, the second display driver IC 345 may transmit second content (e.g., message text) data stored in the second memory 347, to a display panel such that another AOD object associated with the first AOD object (e.g., the message application icon 11) is displayed in the switched section of the second area 30 in addition to the first AOD object (e.g., the weather application icon 12) selected by the user. As such, the second AOD object 31 and/or the third AOD object 32 according to the processing of the second content data may be displayed in the switched section of the second area 30. Furthermore, the first display driver IC 341 may allow the second display object (e.g., 22a), which is displayed in the adjacent area of the first AOD object (e.g., the weather application icon 12) (or the adjacent area of the first display object 21a included in the selected first AOD object) selected from the user, to disappear. The first display driver IC 341 may display the second display object 22b in the adjacent area (or the adjacent area of the first display object 21b included in the first AOD object other than the selected first AOD object) of a first AOD object (e.g., the message application icon 11) associated with the AOD object displayed in the switched section of the second area 30.

Referring to FIG. 8C, the first display driver IC 341 may display at least one first AOD object 36, 37, or 38 in an area substantially corresponding to the upper end of the display screen area of the electronic device 300a in a closed state. For example, the first display driver IC 341 may display the first AOD object 36, 37, or 38 (e.g., an application icon) of the specified number of applications executed frequently by the user or the specified number of applications set by the user, regardless of the reception of data from an external device. In an embodiment, when a specified user input (e.g., touch) is applied to one (e.g., the calendar application icon 37) of the displayed first AOD object 36, 37, or 38, the first display driver IC 341 may display the first display object 21 in the adjacent area of the first AOD object 37 to which the user input is applied.

According to an embodiment, in a state wherein at least one of the displayed first AOD objects 36, 37, or 38 are selected from the user, when the electronic device 300b is transitioned to an open state, the second display driver IC 345 may display an eighth AOD object 39 (e.g., a schedule information text, a number or a symbol) associated with the selected first AOD object 37, in the second area 30. In an embodiment, when a specified user input (e.g., long press) is applied to the second area 30 or one area of the eighth AOD object 39, the processor 330 in an inactive state may be activated. The activated processor 330 may output content 75, which is supported by an application (e.g., a calendar application) associated with the eighth AOD object 39 in the second area 30 in a non-AOD state (or high resolution).

FIGS. 9A to 9E are views illustrating various operation examples of an expanded screen area of an electronic device in an open state, according to an embodiment.

In FIGS. 9A to 9E, an electronic device 300c and an electronic device 300d are in an active state (or a wake-up state), the electronic device 300c is in an open state, and the electronic device 300d is in a closed state. Furthermore, in FIGS. 9B to 9E, a display screen area that is expanded based on the open of the electronic device 300c may be referred to as an area substantially corresponding to the upper end with respect to the electronic device 300c.

Figure 9A:
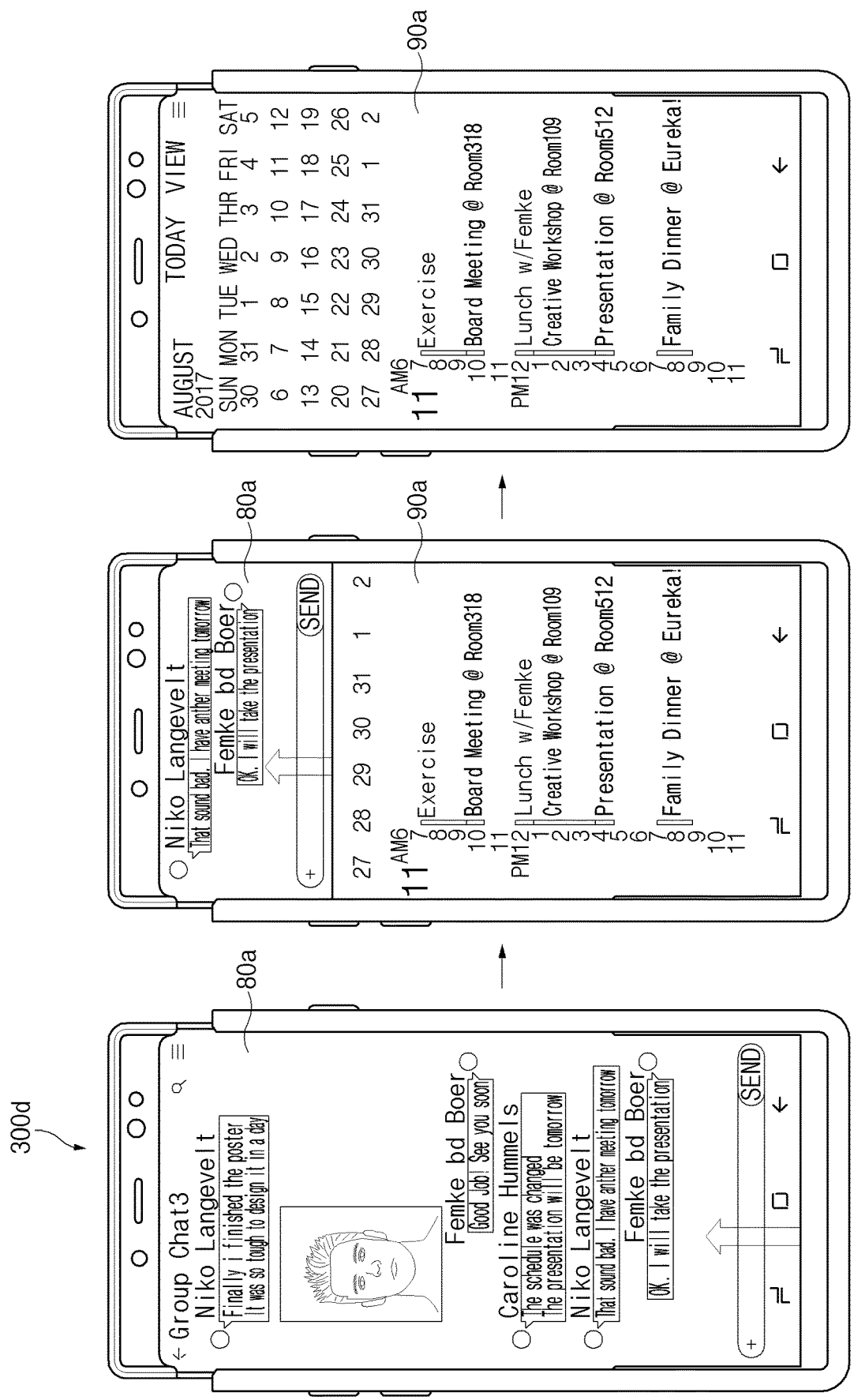
FIG. 9A is a view illustrating a first operation example of an expanded screen area of an electronic device in an open state, according to an embodiment.

Referring to FIG. 9A, in a state where the electronic device 300d in an activated and closed state outputs a first execution screen 80a according to the execution of an arbitrary first application, the processor 330 of FIG. 3 in the active state may receive a specified user input (e.g., a swipe applied upward from the lower area of the electronic device 300d or the first execution screen 80a). Alternatively, in a state where the first execution screen 80a is output, the processor 330 in the active state may receive a user input applied to a specified hardware key (e.g., a home button) or to a software key displayed in one area of the running first execution screen 80a. In this case, the processor 330 in the active state may reduce the running (i.e., running in the foreground) of the first execution screen 80a at a specified ratio to display (or move) the reduced result in the upper area of the electronic device 300c and may display a second execution screen 90a according to an application in the background, in an area other than the reduced first execution screen 80a. In an embodiment, the processor 330 in the active state may simultaneously display the first execution screen 80a and the second execution screen 90a during a specified time; when the specified time elapses, the processor 330 in the active state may process the second execution screen 90a in the foreground and may process the first execution screen 80a in the background.

Figure 9B:
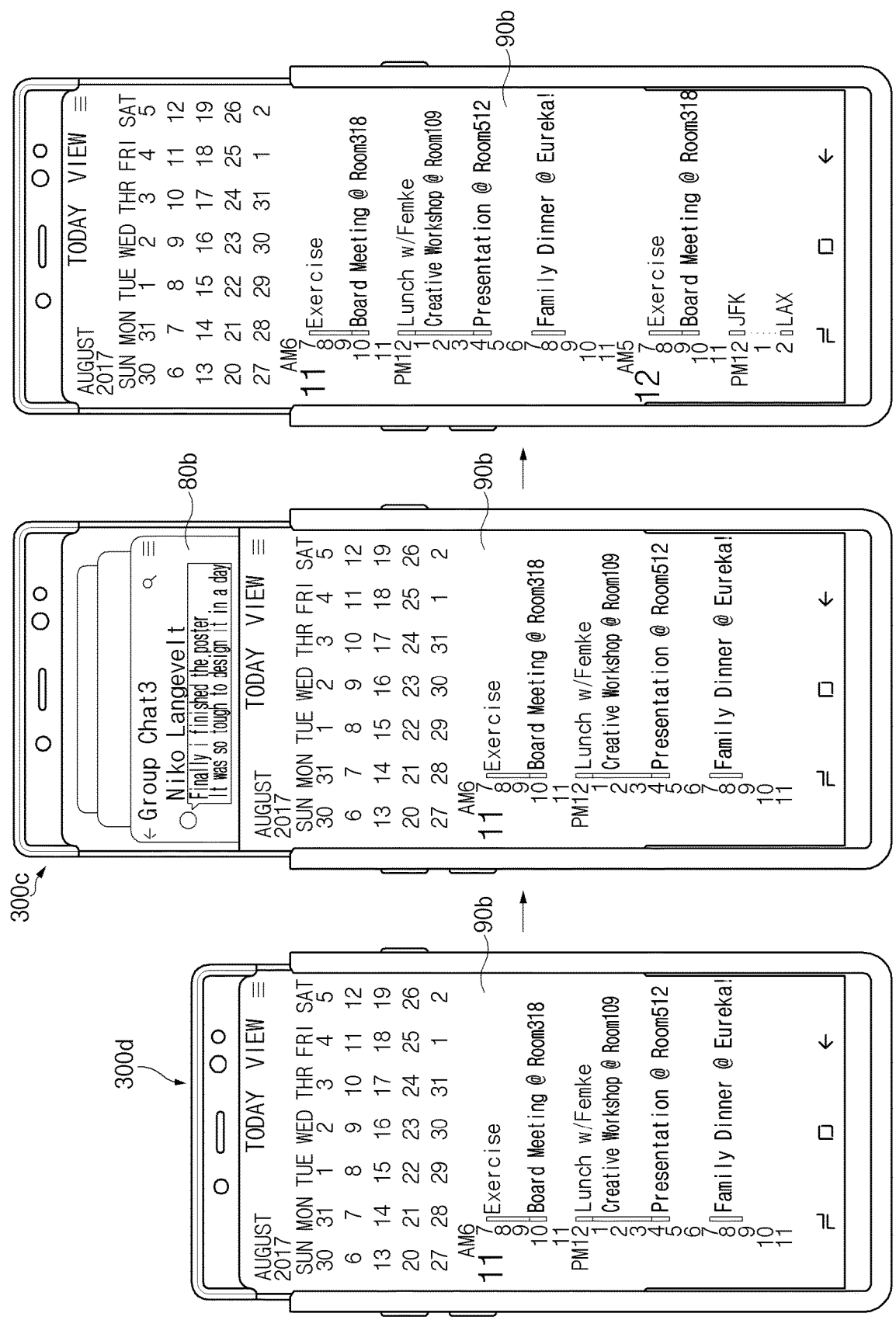
FIG. 9B is a view illustrating a second operation example of an expanded screen area of an electronic device in an open state, according to an embodiment.
Figure 9C:
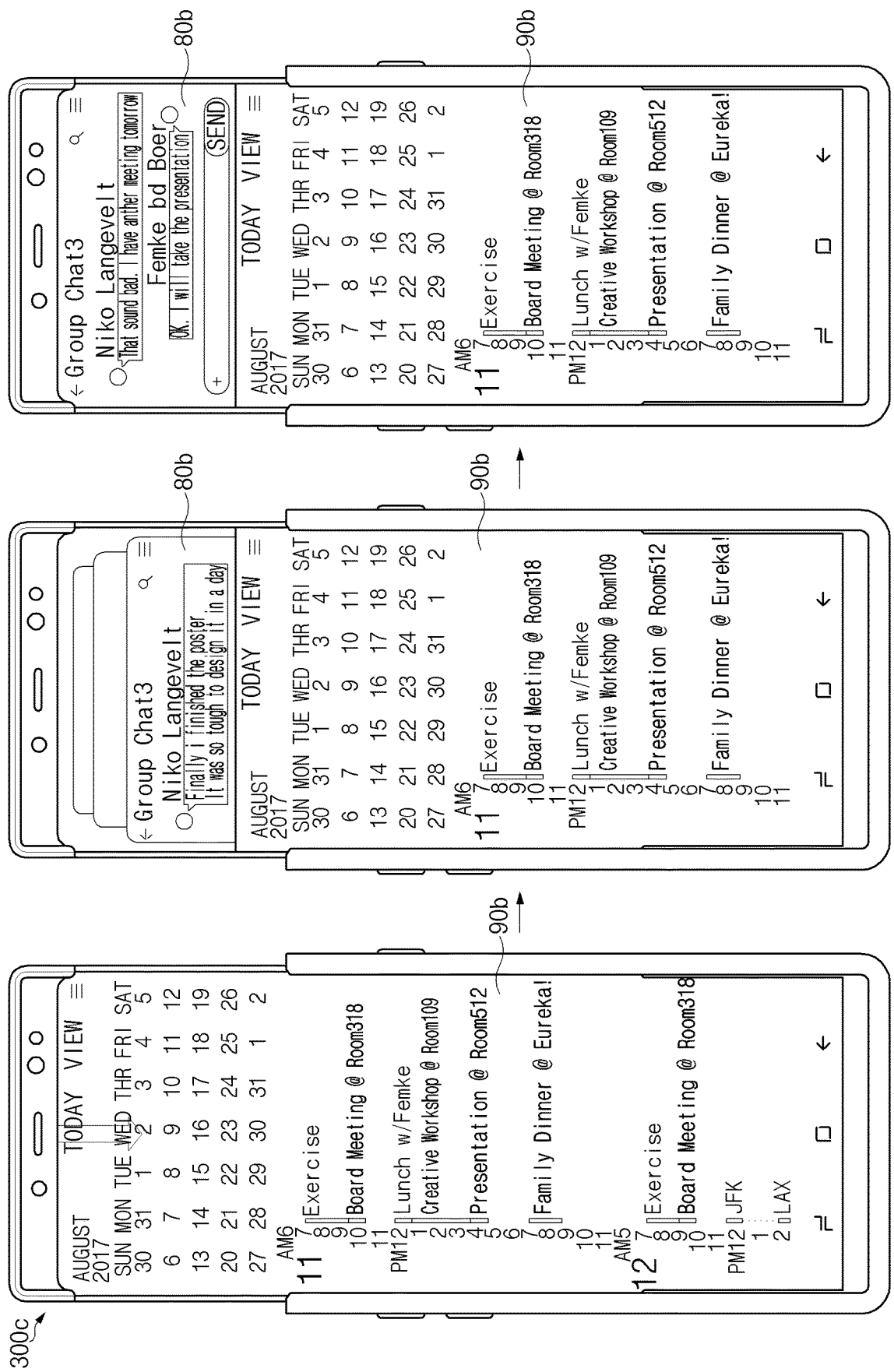
FIG. 9C is a view illustrating a third operation example of an expanded screen area of an electronic device in an open state, according to an embodiment.

Referring to FIGS. 9B and 9C, where the electronic device 300d is in the activated and closed state, the electronic device 300d outputs a third execution screen 90b according to the execution of an arbitrary application, the electronic device 300d in the closed state may be transitioned to the electronic device 300c in an open state by user control. In this case, when the processor 330 in the active state outputs the third execution screen 90b, the processor 330 in the active state may display a part of at least one fourth execution screen 80b of at least one application in the background in the screen area of the expanded display 340 of FIG. 3. In an embodiment, when a specified time elapses from when the part of the fourth execution screen 80b is displayed, the processor 330 in the active state may exclude a partial display of the fourth execution screen 80b and may expand the third execution screen 90b, which has been output, at a specified ratio to display the expanded third execution screen 90b in the form of a full screen.

In an embodiment, when the processor 330 in the active state displays the third execution screen 90b in the form of a full screen, the processor 330 in the active state may receive a specified user input (e.g., swipe applied downward from the upper area of the electronic device 300c or the third execution screen 90b). In this case, the processor 330 in the active state may reduce the third execution screen 90b being displayed as a full screen at a specified ratio to display the reduced result, and may display a part of at least one fourth execution screen 80b of at least one application of the background state, in an area (or an expanded display area) other than the reduced third execution screen 90b. In an embodiment, when one of the at least one fourth execution screen 80b is selected from a user, the processor 330 in the active state may display the selected fourth execution screen 80b in an area (or an expanded display screen area) other than the reduced third execution screen 90b.

Figure 9D:
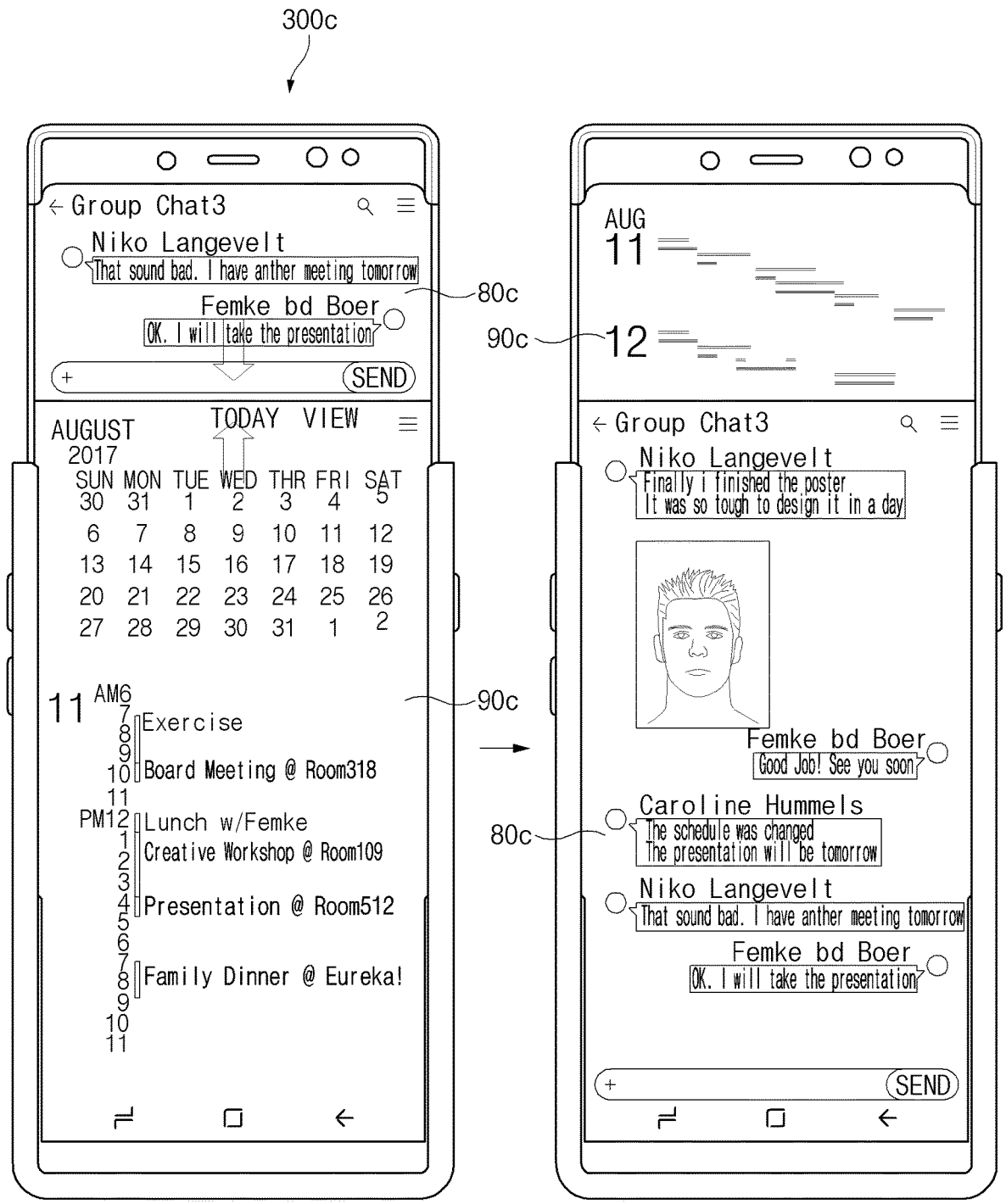
FIG. 9D is a view illustrating a fourth operation example of an expanded screen area of an electronic device in an open state, according to an embodiment.

Referring to FIG. 9D, in a state where the electronic device 300c in the open state outputs a fifth execution screen 80c and a sixth execution screen 90c according to the execution of arbitrary applications at the same time, the processor 330 in the active state may receive a user input to exchange output locations of the fifth execution screen 80c and the sixth execution screen 90c with each other. For example, when the processor 330 in the active state receives a long press applied to the boundary area between the fifth execution screen 80c and the sixth execution screen 90c during a specified time, and receives a swipe in a direction (e.g., downward) applied to the area of the fifth execution screen 80c or receives a swipe in a direction (e.g., upward) applied to the area of the sixth execution screen 90c, the processor 330 in the active state may exchange output locations of the fifth execution screen 80c and sixth execution screen 90c and output (i.e., display) the fifth execution screen 80c and sixth execution screen 90c according to the exchanged locations.

Figure 9E:
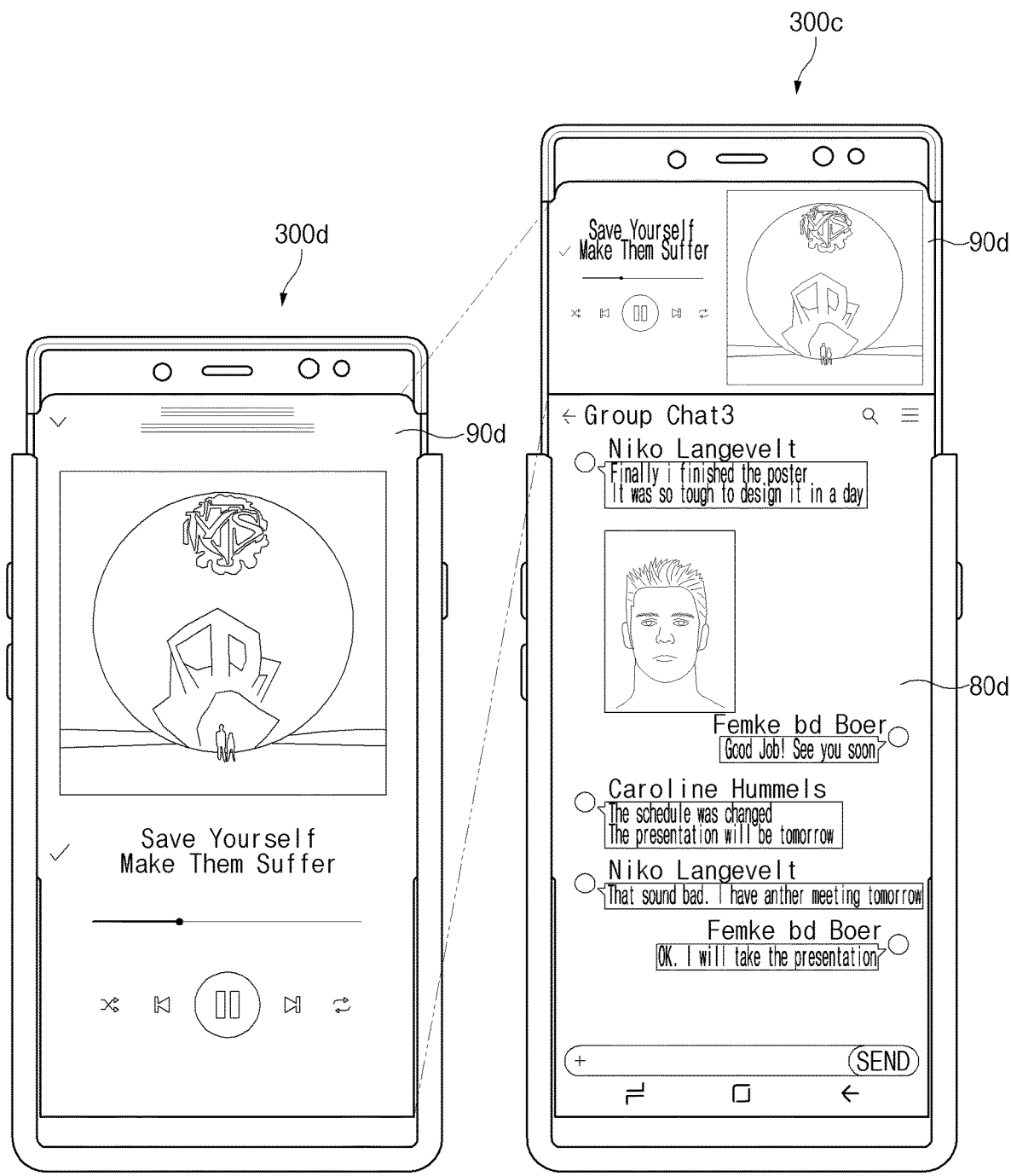
FIG. 9E is a view illustrating a fifth operation example of an expanded screen area of an electronic device in an open state, according to an embodiment.

Referring to FIG. 9E, a seventh execution screen 90d displayed in the expanded display area of the electronic device 300c in an open state may be output in the second format at least partially different from the first format output by the electronic device 300d in a closed state. For example, in the second format, the reduction of a specified ratio (e.g., 16:9) may be applied to the first format or the relocation of at least one content included in the seventh execution screen 90d may be applied to the second format. In an embodiment, the reduction of the specified ratio or the relocation of content may be designated by the policy of an application associated with the seventh execution screen 90d or may be designated by the user's settings.

According to an embodiment, an electronic device may include a first structure, a second structure, a flexible touch screen display layer, an application processor, at least one display driver integrated circuit operatively connected to the flexible touch screen display layer and the application processor, and a memory operatively connected to the at least one display driver integrated circuit.

The first structure may include a first surface and a second surface facing away from the first surface.

The second structure may include a second plate facing the second surface of the first plate, a first sidewall perpendicular to the second plate, a second sidewall perpendicular to the first sidewall and the second plate, and a third sidewall perpendicular to the first sidewall and the second plate and parallel to the second sidewall.

The second plate, the first sidewall, the second sidewall, and the third sidewall may form a trough, one side of which is opened, together which accommodate at least part of the first structure.

The first structure may be capable of being moved, in a first direction parallel to the second plate and the second sidewall, between an open state and a closed state with respect to the second structure, the first structure in the closed state may be positioned at a first distance from the first sidewall, and the first structure in the open state may be positioned at a second distance, which is greater than the first distance, from the first sidewall.

The flexible touch screen display layer may include a plane part extending to cross at least part of the first surface of the first plate and mounted on the first surface, and a bendable portion extending into a space between the first sidewall of the second structure and the first structure from the plane part in the closed state.

When the first structure is moved from the closed state to the open state, at least part of the bendable portion may be pulled from the space between the first sidewall of the second structure and the first structure to substantially form a plane between the plane part and the first sidewall of the second structure, when viewed from above the first plate.

The memory may store instructions that, when executed while the application processor is inactivated, cause the at least one display driver integrated circuit to display at least one first object in a first area of the plane part of the flexible touch screen display layer in the closed state, and to display at least one second object associated with the first object in a second area of the plane part or in a third area of the bendable portion of the flexible touch screen display layer in the open state.

The first area may be positioned between the second area and the first sidewall of the second structure, and the third area may be positioned between the first area and the first sidewall of the second structure.

The instructions may cause the at least one display driver integrated circuit to further display the first object in a fourth area corresponding to a space between the first area and the first sidewall of the second structure, in the open state while the second object is displayed in the second area.

The instructions may cause the at least one display driver integrated circuit to move and display the first object from the first area to the fourth area, while the first structure is moved from the closed state to the open state.

The instructions may cause the at least one display driver integrated circuit to further display the first object in the first area, in the open state while the second object is displayed in the third area.

The first object may include at least one of a notification, time information, and date information.

The second object may include at least part of content associated with the first object.

The electronic device may further include a sensor circuit detecting movement of the first structure for the second structure and operatively connected to the at least one display driver integrated circuit.

The instructions may cause the at least one display driver integrated circuit to receive a signal from the sensor circuit while the application processor is inactivated and to display the second object based at least partly on the signal.

The memory may further store at least one application program.

The instructions may cause the application processor, which is active, to store at least one first application program associated with displaying the at least one second object among the at least one application program, in a database.

The instructions may cause the application processor, which is active, to output a user interface for receiving a user input to select the at least one first application program.

The instructions may cause the at least one display driver integrated circuit to assign a specified display effect or a display object to the at least one first object while the application processor is inactive, when the at least one first object displayed in the closed state is associated with the at least one first application program.

The instructions may cause the at least one display driver integrated circuit to display at least one area of at least one of the plane part and the bendable portion of the flexible touch screen display layer, in a specified color while the application processor is inactive.

The at least one display driver integrated circuit may include a first display driver integrated circuit controlling the display of the at least one first object for the first area and a second display driver integrated circuit controlling the display of the at least one second object for the second area or the third area.

The at least one display driver integrated circuit may include a first sub memory for storing data associated with the at least one first object and a second sub memory for storing data associated with the at least one second object.

According to an embodiment, an electronic device may include a first plate, a second plate disposed under the first plate, a rollable module interposed between the first plate and the second plate and disposed to move the first plate between an open state and a closed state with respect to the second plate, a flexible touch screen display disposed to extend from an upper portion of the first plate to a space between the rollable module and the second plate, at least one display driver integrated circuit, and a processor electrically connected to the flexible touch screen display and the at least one display driver integrated circuit. At least part of the flexible touch screen display may be guided by the rollable module, and a screen area of the flexible touch screen display may be expanded in the open state.

The at least one display driver integrated circuit may be configured to display at least one first object in a specified first area of the screen area in a state where the processor is inactive and in a state where the screen area of the flexible touch screen display is not expanded, and to display at least one second object associated with the first object in a second area corresponding to an upper portion of the specified first area of an expanded screen area or in a third area corresponding to a lower portion of the specified first area in a state where the processor is inactive and in a state where the screen area of the flexible touch screen display is expanded.

According to an embodiment, an electronic device may include a flexible touch screen display, a screen area of which is expanded depending on structural transformation of the electronic device, at least one display driver integrated circuit, and a processor electrically connected to the flexible touch screen display and the at least one display driver integrated circuit.

The at least one display driver integrated circuit may be configured to display at least one first object in a specified first area of the screen area in a state where the processor is inactive and in a state where the screen area of the flexible touch screen display is not expanded, and to display at least one second object associated with the first object, in a second area corresponding to an upper portion of the specified first area of the expanded screen area or in a third area corresponding to a lower portion of the specified first area in a state where the processor is inactive and in a state where the screen area of the flexible touch screen display is expanded.

Figure 10:
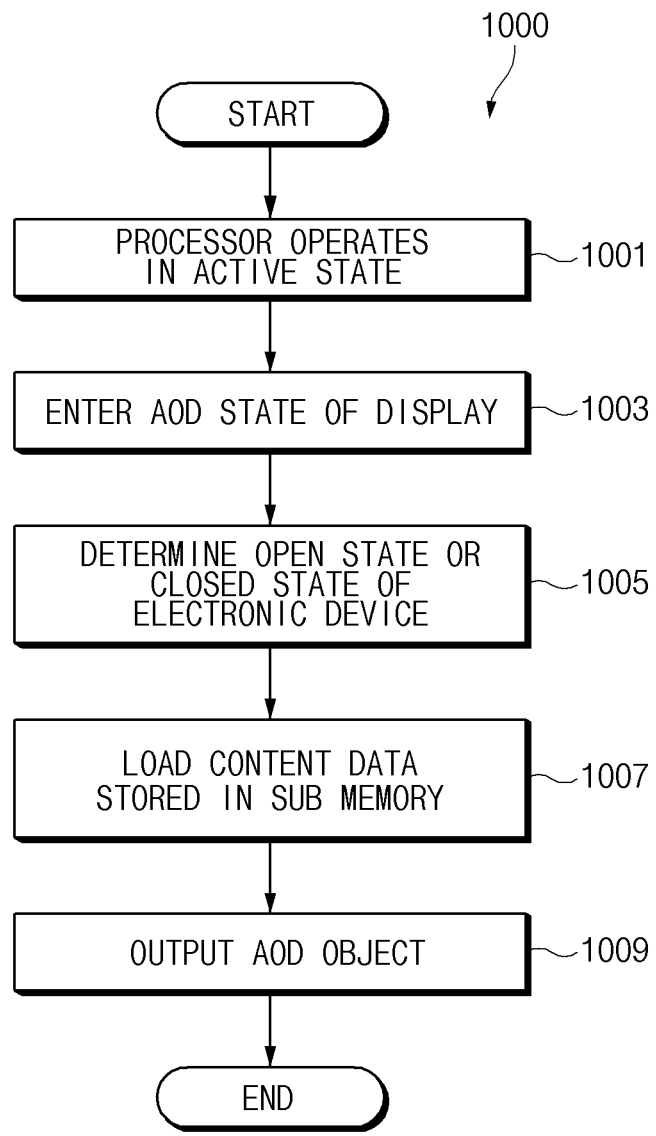
FIG. 10 is a flowchart illustrating a content displaying method of an expandable screen area of an electronic device, according to an embodiment.

FIG. 10 is a flowchart illustrating a content displaying method 1000 of an expandable screen area of an electronic device, according to an embodiment. The operations described with reference to FIG. 10 may be implemented based on instructions capable of being stored in a computer recording medium or the memory 320 of FIG. 3.

Referring to FIG. 10, in operation 1001, a processor 330 operates in an active state. For example, the processor 330 may operate in an active state in response to an electronic device 300*a* or 300*b* being in the active state (or a wake-up state) and/or the closed state or open state. In an embodiment, in a state where the electronic device 300*a* or 300*b* is in an inactive state (or a sleep state), the processor 330 in the active state may define content to be output through the display 340 of FIG. 3 in an AOD state and may store the related content data in a first memory 343 and/or a second memory 347 included in at least one first display driver IC 341 and/or second display driver IC 345.

In operation 1003, the display 340 enters the AOD state. For example, as the electronic device 300*a* or 300*b* operates in an inactive state, the display 340 may enter the AOD state, which makes it possible to operate at low power. Also, the processor 330 may also be transitioned to an inactive state, in response to deactivation of the electronic device 300*a* or 300*b*.

In operation 1005, the sensor hub 350 of FIG. 3 may determine the open state or closed state of the electronic device 300*a* or 300*b*. For example, the sensor hub 350 may determine the open state or closed state of the electronic device 300*a* or 300*b* by detecting the coordinates or pixel change of the display 312 that contacts or approaches dielectric substance 351 disposed on the lower area of the display 312.

In operation 1007, at least one first display driver IC 341 and/or second display driver IC 345 loads content data stored in the first memory 343 and/or second memory 347, depending on the inactive state of the electronic device 300*a* or 300*b*, to take the place of at least part of the functional operations of the processor 330 in an inactive state. For example, in the operation 1005, when it is determined that the electronic device 300*a* in an inactive state is in a closed state, the first display driver IC 341 of the at least one display driver IC may load content data stored in the first memory 343 to transmit the loaded content data to a display panel. Alternatively, in the operation 1005, when it is determined that the electronic device 300*b* in an inactive state is in an open state, each of the first display driver IC 341 and second display driver IC 345 may load content data stored in the first memory 343 and the second memory 347 to transmit the loaded content data to the display panel.

In operation 1009, the display 340 (or the display panel) in an AOD state processes the content data transmitted from at least one first display driver IC 341 and/or second display driver IC 345 to output an AOD object to a specified area of a screen area. In this operation, the pixel of the display 340 corresponding to the display coordinates of the AOD object may be emitted in a specified first color (e.g., white), and the remaining pixels may be emitted in a specified second color (e.g., black) or may be turned off.

According to an embodiments, a method of displaying content of an expandable screen area of an electronic device may include operating in an inactive state by the electronic device in an inactive state, in a first state where the electronic device is inactive and where a screen area of a display of the electronic device is not expanded, displaying at least one first object in a specified first area of the screen area, and in a second state where the electronic device is inactive and where the screen area of the display of the electronic device is expanded, displaying at least one second object associated with the first object, in a second area corresponding to an upper portion of the first area of the expanded screen area or in a third area corresponding to a lower portion of the first area.

The method of displaying content may further include detecting expansion of the screen area of the display.

The displaying of the at least one second object may include determining whether to display the at least one second object, based at least partly on the detecting.

The displaying of the at least one second object may include further displaying the at least one first object in a lower portion of the second area or in an upper portion of the third area while displaying the at least one second object in the second area.

The displaying of the at least one second object may include further displaying the at least one first object in the first area while displaying the at least one second object in the third area.

The displaying of the at least one first object may include assigning a specified display effect or a display object to the at least one first object when an application program associated with the at least one first object corresponds to a specified first application program for displaying the at least one second object.

The displaying of the at least one first object or the displaying of the at least one second object may include displaying at least one area of at least one of the screen area of the display, which is not expanded, or the screen area of the display, which is expanded, in a specified color.

Figure 11:
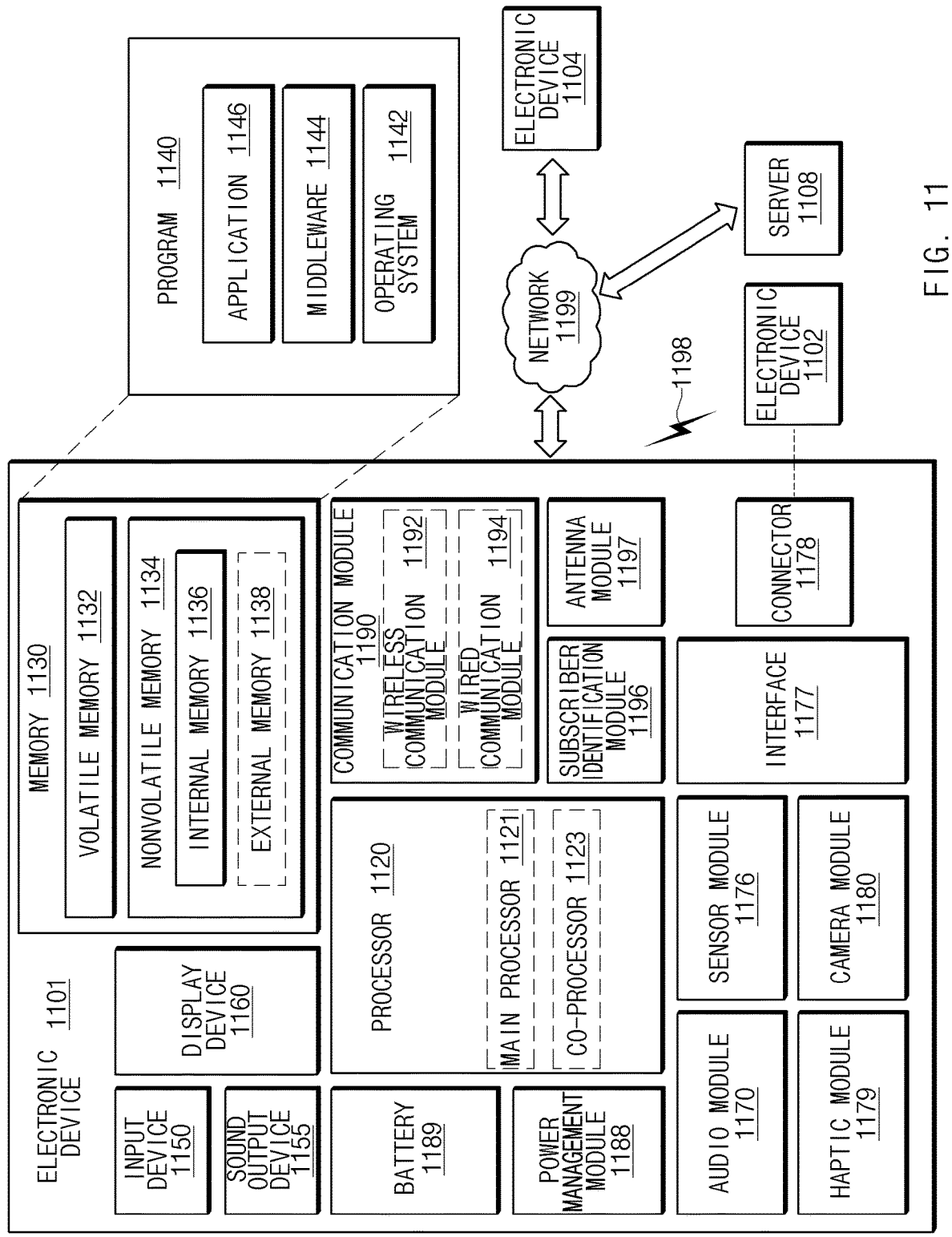
FIG. 11 is a diagram illustrating an electronic device in a network environment, according to an embodiment.

FIG. 11 is a diagram illustrating an electronic device in a network environment, according to an embodiment.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192

(e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Accordingly, even when an electronic device operates in a sleep state, various pieces of information may be provided via a display operating at low power.

Additionally, details of the information may be improved based on the expansion of the size (or screen area) of a display operating at low-power.

In addition, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first structure including a first plate, wherein the first plate includes a first surface and a second surface facing away from the first surface;
   a second structure including a second plate facing the second surface of the first plate, a first sidewall perpendicular to the second plate, a second sidewall perpendicular to the first sidewall and the second plate, and a third sidewall perpendicular to the first sidewall and the second plate and parallel to the second sidewall,
   wherein the second plate, the first sidewall, the second sidewall, and the third sidewall form a trough to accommodate at least part of the first structure, and one side of the trough is opened,
   wherein the first structure is capable of being moved in a first direction parallel to the second plate and the second sidewall between an open state and a closed state with respect to the second structure,
   wherein the first structure in the closed state is positioned at a first distance from the first sidewall, and
   wherein the first structure in the open state is positioned at a second distance, which is greater than the first distance, from the first sidewall;
   a flexible touch screen display layer, wherein the flexible touch screen display layer includes:
   a plane part extending across at least part of the first surface of the first plate and mounted on the first surface; and
   a bendable portion extending into a space between the first sidewall of the second structure and the first structure from the plane part in the closed state,
   wherein when the first structure is moved from the closed state to the open state, at least part of the bendable portion is pulled from the space between the first sidewall of the second structure and the first structure to substantially form a plane between the plane part and the first sidewall of the second structure, when viewed from above the first plate;
   an application processor;
   at least one display driver integrated circuit operatively connected to the flexible touch screen display layer and the application processor; and
   a memory operatively connected to the at least one display driver integrated circuit, wherein the memory stores instructions that, when executed while the application processor is inactivated, cause the at least one display driver integrated circuit to:
   display at least one first object in a first area of the plane part of the flexible touch screen display layer in the closed state; and
   display at least one second object associated with the first object in a second area of the plane part or in a third area of the bendable portion of the flexible touch screen display layer in the open state,
   wherein the first area is positioned between the second area and the first sidewall of the second structure, and the third area is positioned between the first area and the first sidewall of the second structure.

2. The electronic device of claim 1, wherein the instructions further cause the at least one display driver integrated circuit to:
   in the open state, while the second object is displayed in the second area, further display the first object in a fourth area corresponding to a space between the first area and the first sidewall of the second structure.

3. The electronic device of claim 2, wherein the instructions further cause the at least one display driver integrated circuit to:
   while the first structure is moved from the closed state to the open state, move and display the first object from the first area to the fourth area.

4. The electronic device of claim 1, wherein the instructions further cause the at least one display driver integrated circuit to:
   in the open state, while the second object is displayed in the third area, further display the first object in the first area.

5. The electronic device of claim 1, wherein the first object includes at least one of a notification, time information, and date information, and
   wherein the second object includes at least part of content associated with the first object.

6. The electronic device of claim 1, further comprising:
   a sensor circuit configured to detect movement of the first structure for the second structure and operatively connected to the at least one display driver integrated circuit.

7. The electronic device of claim 6, wherein the instructions further cause the at least one display driver integrated circuit to:
while the application processor is inactivated, receive a signal from the sensor circuit; and
display the second object based at least partly on the signal.

8. The electronic device of claim 1, wherein the memory further stores at least one application program, and
wherein the instructions cause the application processor, which is active, to:
store at least one first application program associated with displaying the at least one second object among the at least one application program, in a database.

9. The electronic device of claim 8, wherein the instructions further cause the application processor, which is active, to:
output a user interface for receiving a user input to select the at least one first application program.

10. The electronic device of claim 8, wherein the instructions further cause the at least one display driver integrated circuit to:
while the application processor is inactive, when the at least one first object displayed in the closed state is associated with the at least one first application program, assign a specified display effect or a display object to the at least one first object.

11. The electronic device of claim 1, wherein the instructions further cause the at least one display driver integrated circuit to:
while the application processor is inactive, display at least one area of at least one of the plane part and the bendable portion of the flexible touch screen display layer, in a specified color.

12. The electronic device of claim 1, wherein the at least one display driver integrated circuit includes a first display driver integrated circuit controlling display of the at least one first object for the first area and a second display driver integrated circuit controlling display of the at least one second object for the second area or the third area.

13. The electronic device of claim 1, wherein the at least one display driver integrated circuit includes a first sub memory for storing data associated with the at least one first object and a second sub memory for storing data associated with the at least one second object.

14. An electronic device comprising:
a first plate;
a second plate disposed under the first plate;
a rollable module interposed between the first plate and the second plate and disposed to move the first plate between an open state and a closed state with respect to the second plate;
a flexible touch screen display disposed to extend from an upper portion of the first plate to a space between the rollable module and the second plate, wherein at least part of the flexible touch screen display is guided by the rollable module, and a screen area of the flexible touch screen display is expanded in the open state;
at least one display driver integrated circuit; and
a processor electrically connected to the flexible touch screen display and the at least one display driver integrated circuit,
wherein the at least one display driver integrated circuit is configured to:
in a first state where the processor is inactive and the screen area of the flexible touch screen display is not expanded, display at least one first object in a specified first area of the screen area; and
in a second state where the processor is inactive and the screen area of the flexible touch screen display is expanded, display at least one second object associated with the first object, in a second area corresponding to an upper portion of the specified first area of the expanded screen area or in a third area corresponding to a lower portion of the specified first area.

* * * * *